(12) United States Patent
Itoh et al.

(10) Patent No.: US 7,940,535 B2
(45) Date of Patent: May 10, 2011

(54) DISCHARGE LAMP LIGHTING DEVICE FOR LIGHTING DISCHARGE LAMPS

(75) Inventors: Hiroshi Itoh, Chiba (JP); Sakae Saitoh, Chiba (JP); Mitsuyoshi Seo, Funabashi (JP); Akinobu Takeda, Tokyo (JP)

(73) Assignee: Sharp Kabushiki Kaisha, Osaka (JP)

( * ) Notice: Subject to any disclaimer, the term of this patent is extended or adjusted under 35 U.S.C. 154(b) by 371 days.

(21) Appl. No.: 12/097,248

(22) PCT Filed: Dec. 1, 2006

(86) PCT No.: PCT/JP2006/324092
§ 371 (c)(1),
(2), (4) Date: Jun. 12, 2008

(87) PCT Pub. No.: WO2007/069481
PCT Pub. Date: Jun. 21, 2007

(65) Prior Publication Data
US 2009/0289557 A1    Nov. 26, 2009

(30) Foreign Application Priority Data

Dec. 14, 2005   (JP) ................................ 2005-360808

(51) Int. Cl.
*H02M 3/335* (2006.01)
*H05B 37/02* (2006.01)
(52) U.S. Cl. ............... 363/21.12; 363/21.15; 363/56.03; 363/56.04; 363/56.05; 315/158; 315/274; 315/247; 315/291
(58) Field of Classification Search ............... 363/21.12, 363/21.15, 21.16, 21.07, 56.03, 56.04, 56.05, 363/56.07, 56.08, 56.09, 56.1, 56.11; 315/247, 315/246, 209 R, 224, 225, 291, 297, 307–311, 274–289
See application file for complete search history.

(56) References Cited

U.S. PATENT DOCUMENTS

| 6,229,723 B1 * | 5/2001 | Umetsu et al. ................. 363/71 |
| 2004/0190311 A1 | 9/2004 | Sakai |
| 2005/0169019 A1 * | 8/2005 | Konno ............................ 363/49 |

FOREIGN PATENT DOCUMENTS

| JP | 07-302688 A | 11/1995 |
| JP | 08-207652 A | 8/1996 |
| JP | 09-320772 A | 12/1997 |
| JP | 2000/209850 A | 7/2000 |
| JP | 2001-037219 A | 2/2001 |
| JP | 2003-189606 A | 7/2003 |
| JP | 2004-289981 A | 10/2004 |
| JP | 2005-110386 A | 4/2005 |

* cited by examiner

*Primary Examiner* — Tuyet Thi Vo
(74) *Attorney, Agent, or Firm* — Birch, Stewart, Kolasch & Birch, LLP

(57) ABSTRACT

A transformer 6 and a photocoupler 5 are provided to ensure insulation between a primary side circuit section 10 connected to an alternating current power supply 2, and a secondary side circuit section 20 for applying a voltage to a lamp 4. A detection circuit section 22E, provided in the secondary side circuit section 20, detects an output voltage and an output current of the lamp 4 to detect a deviation from a predetermined power. A signal corresponding to the deviation, which has been detected by the detection circuit section 22E, is transmitted to the primary side circuit section 10 via the photocoupler 5 provided between the primary side circuit section 10 and the secondary side circuit section 20. A switching control section 13, provided in the primary side circuit section 10, carries out switching control for constant power lighting based on the signal transmitted from the photocoupler 5.

10 Claims, 23 Drawing Sheets

F I G. 4
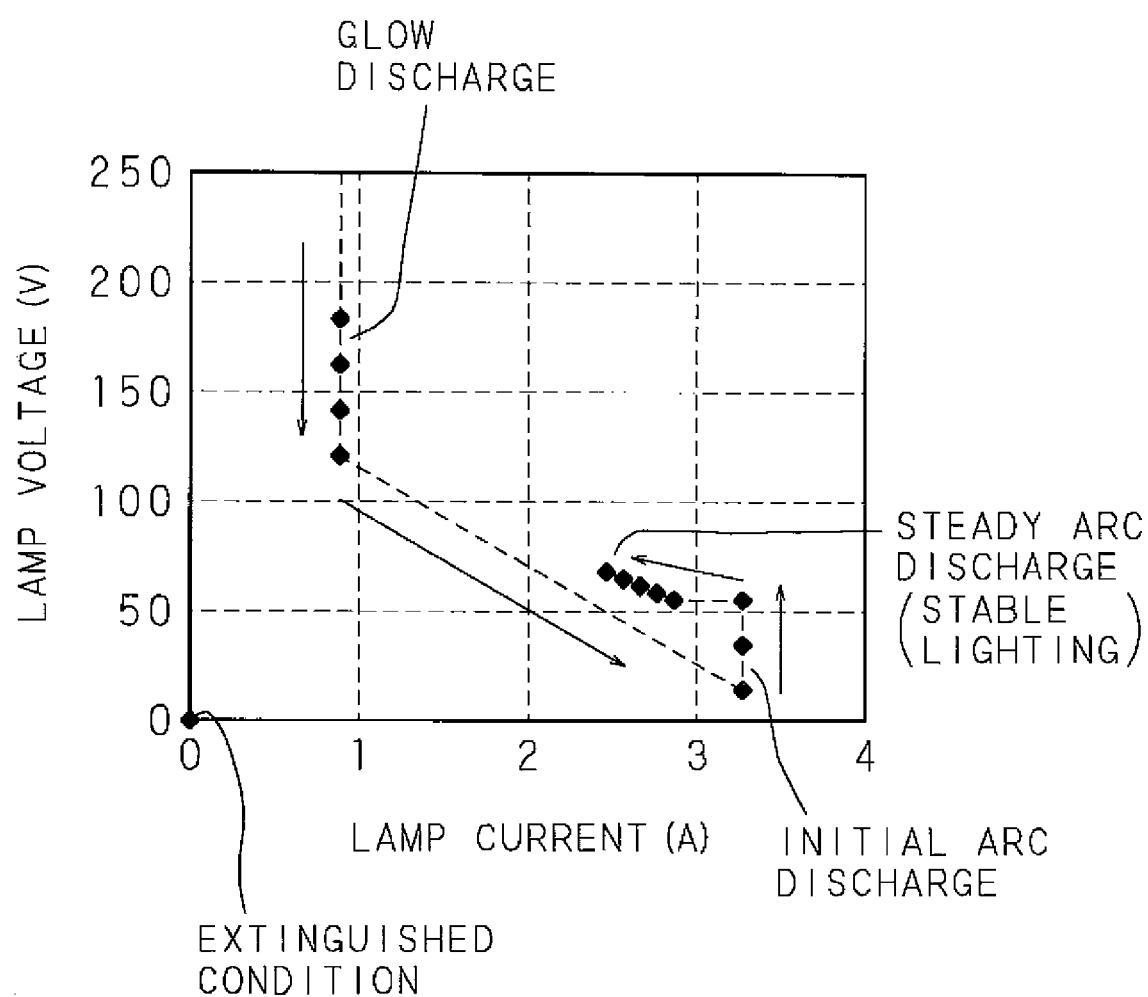

F I G. 12
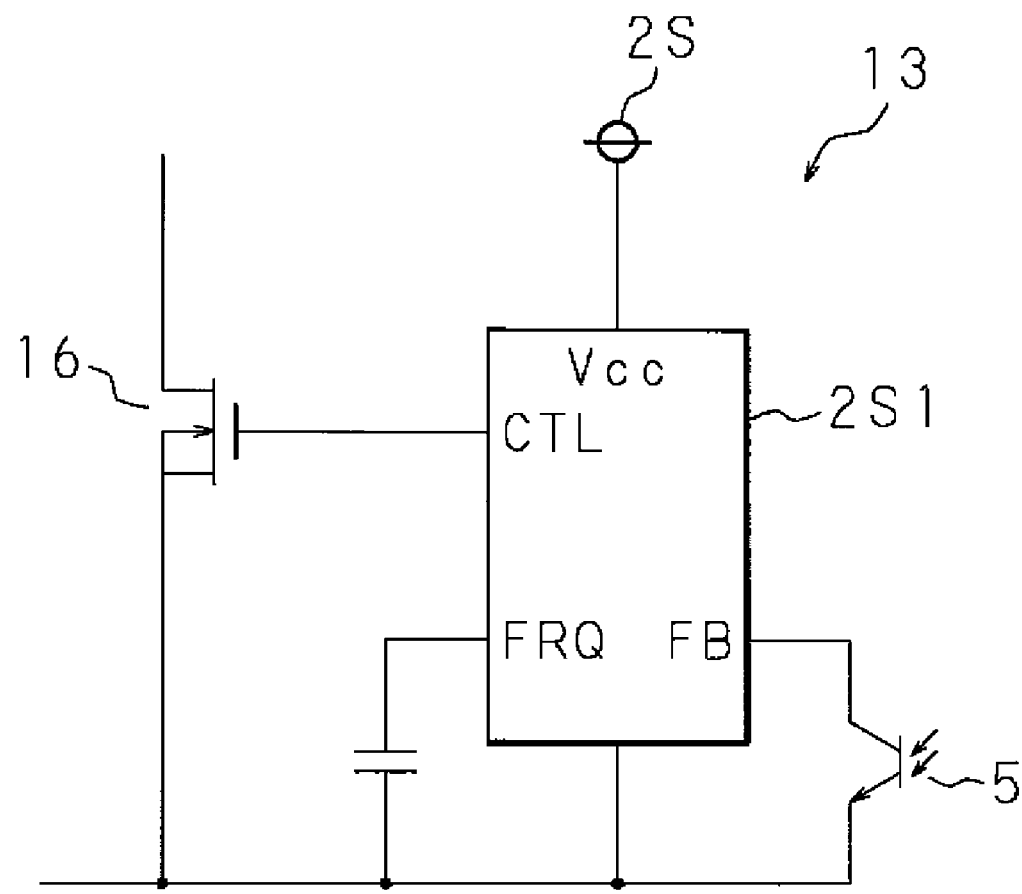

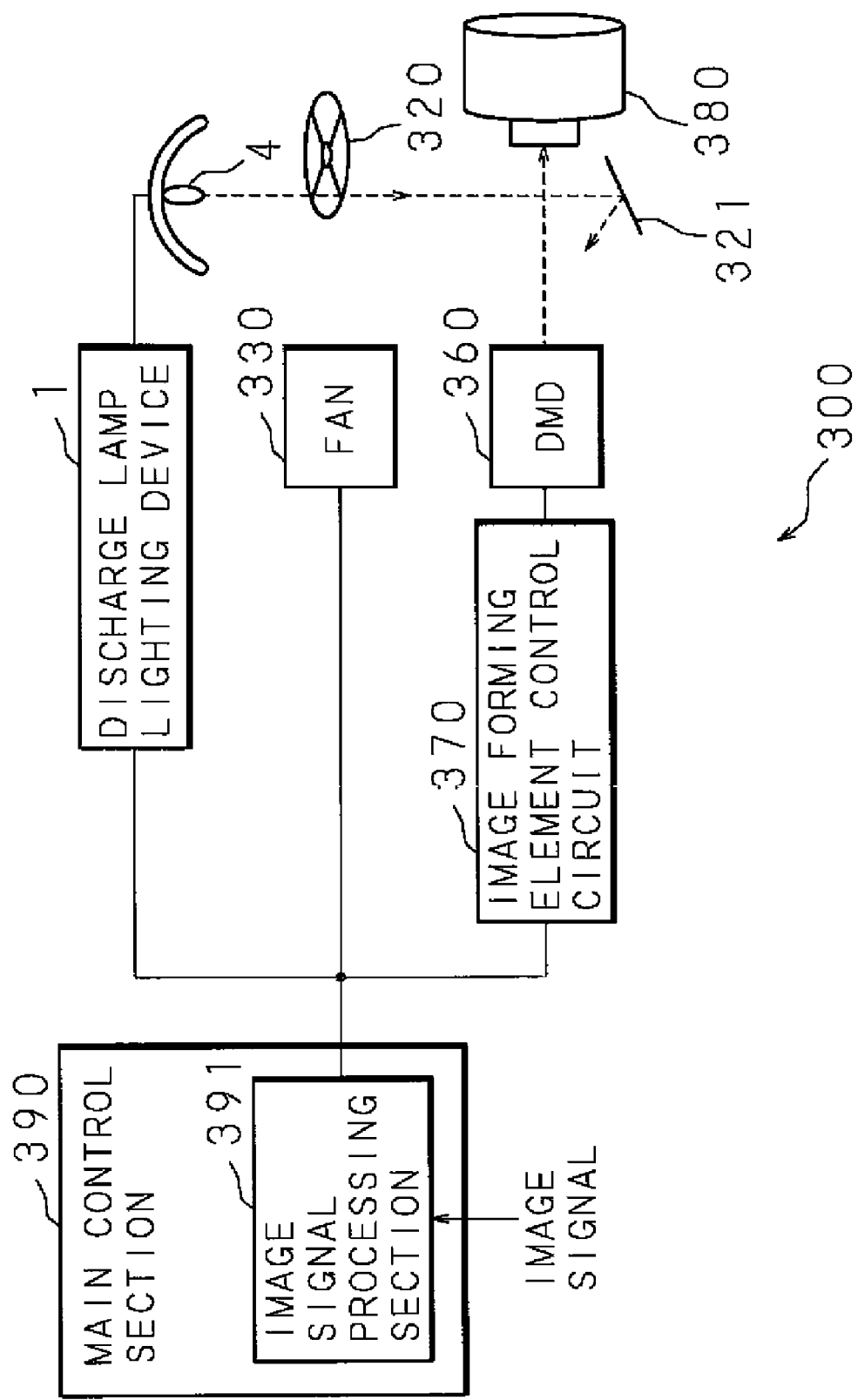

DISCHARGE LAMP LIGHTING DEVICE FOR LIGHTING DISCHARGE LAMPS

CROSS-REFERENCE TO RELATED APPLICATIONS

This application is the national phase under 35 U.S.C. §371 of PCT International Application No. PCT/JP2006/324092 which has an International filing date of Dec. 1, 2006 and designated the United States of America.

TECHNICAL FIELD

The present invention relates to discharge lamp lighting devices for lighting discharge lamps such as metal halide lamps or high-pressure mercury-vapor lamps.

BACKGROUND ART

Conventionally, a projection type display (projector) for displaying an image on a screen by projecting light has been known. As a light source for this projector, a discharge lamp such as a metal halide lamp has been used, and a discharge lamp lighting device for starting up the discharge lamp and for maintaining the lighting has been utilized. A conventional discharge lamp lighting device is disclosed in Patent Document 1, for example. FIG. 21 is a circuit diagram showing a configuration of a conventional discharge lamp lighting device. In FIG. 21, 100 denotes the conventional discharge lamp lighting device, which includes: a line filter 102 connected to an alternating current power supply 101; a rectifier bridge 103; a step-up converter 104; a step-down converter 105; and an igniter 106 that is operated when a lamp 107 is started up. The step-up converter 104 converts commercial AC power to a direct current, and may thus be called a "power supply" in combination with the line filter 102 and the rectifier bridge 103. On the other hand, the step-down converter 105 chops and controls current or voltage when the converter is configured as a switching regulator type, and may thus be called a "step-down chopper". Similarly, the step-up converter may be called a "step-up chopper". The rectifier bridge 103 includes four diodes, and may be called a "diode bridge".

Furthermore, the step-down converter 105 carries out control so that the product of the voltage of both ends of the lamp 107 and the current flowing therethrough is kept constant, and may thus be called a "ballast". The power to be supplied to the lamp 107 has a rated value, e.g., 200 W±10%, while the voltage of both ends of the lamp 107 varies due to the life span or the like thereof, and therefore, the power to be supplied is kept within a certain range by controlling the current amount. Further, the lamp 107 may be an alternating current type lamp in which electric potentials of electrodes at two spots, in general, alternate periodically, and a direct current type lamp in which the polarity of electric potential is always constant. In FIG. 21, the device is configured to light a direct current type lamp. For example, an inverter including four FETs is provided between the step-down converter 105 and the igniter 106 to convert the direct current output from the step-down converter 105 to alternating current, thus making it possible to provide for an alternating current lamp.

An alternating current of 100 V to 240 V outputted from the alternating current power supply 101 is rectified in the rectifier bridge 103 via the line filter 102, and a peak voltage (144 V to 340 V), which is approximately √2 times the alternating current, is generated at an output of the rectifier bridge 103. Then, the peak voltage is increased to a direct current of 370 V to 400 V by the step-up converter 104. The step-down converter 105, serving as a ballast, reduces the voltage so that it becomes 100 V to 200 V at the time of glow discharge of the lamp 107, 15 V at the time of initial arc discharge, and 60 V at the time of steady arc discharge. Further, the igniter 106 is a circuit used at the time of the breakdown of the lamp 107, and the igniter 106 is operated when an open-circuit voltage, which is an output of the step-down converter 105, is in the range of 200 V to 300 V. The igniter 106 generates a voltage of about several kV to about several tens of kV, and causes breakdown in the discharge lamp internal gas, thereby starting up the lamp.

Furthermore, a high-intensity discharge lamp lighting device for lighting an alternating current-driven lamp is also known (for example, Patent Document 2). FIG. 22 shows a conventional high-intensity discharge lamp lighting device for lighting an alternating current-driven lamp. In this diagram, 110 denotes the conventional high-intensity discharge lamp lighting device, which includes: a line filter 112 connected to an alternating current power supply 111; a rectifier bridge 113; a step-up transformer 114; a resonant switching power supply control circuit IC; a voltage-controlling oscillator VCO; and a current detection resistor RD for detecting a current flowing through the lamp 117.

The step-up transformer 114 includes a primary coil NP, a secondary coil NS and a feedback coil Nf for a voltage-resonant inverter, and a power switch element Q1 and the rectifier bridge 113 are connected in series to this primary coil NP. A resistor R2 is a startup resistor. When the high-intensity discharge lamp lighting device 110 is started up, and the output voltage of the rectifier bridge 113 is increased from zero volt, power is supplied to the resonant switching power supply control circuit IC1 via the startup resistor R2, thus operating this circuit. In addition to the voltage-controlling oscillator VCO, the resonant switching power supply control circuit IC1 includes a one-shot multivibrator, an error amplifier, a pulse frequency modulator and the like, which are not shown.

The lamp 117, a choke coil L1 and the current detection resistor RD are connected in series to the secondary coil NS of the step-up transformer 114. The conventional high-intensity discharge lamp lighting device 110 carries out constant current control of the current flowing through the lamp 117. Specifically, the lamp current is detected by the current detection resistor RD, and the rectified and smoothed direct current is connected to a control input terminal of the resonant switching power supply control circuit IC1, thereby carrying out the constant current control. When the lamp current has been increased for some reason, the voltage of both ends of the detection resistor RD is increased, and the output voltage of the unshown error amplifier of the resonant switching power supply control circuit IC1 is increased; as a result, the oscillating frequency of the voltage-controlling oscillator VCO is increased to reduce the lamp current.

[Patent Document 1] Japanese Patent Application Laid-Open No. 9-320772

[Patent Document 2] Japanese Patent Application Laid-Open No. 7-302688

DISCLOSURE OF THE INVENTION

Problems to be Solved by the Invention

However, the conventional discharge lamp lighting device described in Patent Document 1 includes two converters, i.e., a step-up converter and a step-down converter, thus causing problems that a great power loss occurs, and the structure thereof is increased in size. Further, the discharge lamp lighting device described in Patent Document 1, and the high-intensity discharge lamp lighting device described in Patent Document 2 both have a non-insulated structure, and therefore, they requires the control of current-carrying parts at respective sections. Therefore, a necessary insulating process is needed at respective sections of the high-intensity discharge lamp lighting device and the lamp, and as a result, there also occurs a problem that the entire device is increased in size.

Moreover, in the high-intensity discharge lamp lighting device described in Patent Document 2, the lamp current is detected, and the lamp current is controlled by the resonant switching power supply control circuit; therefore, there also occurs a problem that when the lamp voltage varies, for example, at the end of the life span of the lamp, it is impossible to provide for the constant power control. Besides, in the high-intensity discharge lamp lighting device described in Patent Document 2, no rectifying means exists in the secondary coil NS side circuit, and therefore, it is impossible to light a direct current-driven lamp.

The present invention has been made in view of the above-described circumstances. And its object is to provide a discharge lamp lighting device, which can achieve the safety and size reduction of the device and enable more elaborate power control of a lamp by insulating a secondary side circuit section from a primary side circuit section and by comparing, in the secondary side circuit section, the power, based on a lamp current and a lamp voltage, with a predetermined target power to perform constant power control, and which performs the constant power control indispensable to the lamp while converting a commercial AC voltage to a DC voltage by a single stage configuration of a converter.

Solution to The Problems

A discharge lamp lighting device according to the present invention is directed to a discharge lamp lighting device for lighting a discharge lamp, the device characterized by including: a primary side circuit section connected to a power supply; a transformer, connected to the primary side circuit section, for transforming a voltage; a secondary side circuit section, connected to the transformer, for applying the transformed voltage to the discharge lamp; a detection circuit section, provided in the secondary side circuit section, for detecting an output voltage and an output current of the discharge lamp to detect a deviation from a predetermined power; a signal transmission element, provided between the primary side circuit section and the secondary side circuit section, for transmitting a signal corresponding to the deviation, which has been detected by the detection circuit section, to the primary side circuit section; and a switching control section, provided in the primary side circuit section, for carrying out switching control for constant power lighting based on the signal transmitted from the signal transmission element.

The discharge lamp lighting device according to the present invention is characterized in that the primary side circuit section is a self-excited flyback converter.

The discharge lamp lighting device according to the present invention is characterized in that the signal transmission element is a photocoupler.

Further, a discharge lamp lighting device according to the present invention is directed to a discharge lamp lighting device for lighting a discharge lamp, the device characterized by including: a primary side circuit section connected to a power supply; a transformer, connected to the primary side circuit section, for transforming a voltage; a secondary side circuit section, connected to the transformer, for applying the transformed voltage to the discharge lamp; a detection circuit section, provided in the secondary side circuit section, for detecting an output voltage and an output current of the discharge lamp to detect a deviation from a predetermined power; a signal transmission element, provided between the primary side circuit section and the secondary side circuit section, for transmitting a signal corresponding to the deviation, which has been detected by the detection circuit section, to the primary side circuit section; and a switching control section, provided in the primary side circuit section, for carrying out switching control for constant power lighting based on the signal transmitted from the signal transmission element, wherein a secondary side winding of the transformer includes a first winding and a second winding, and wherein the secondary side circuit section further includes: an auxiliary circuit for applying a voltage, transformed by the first winding and the second winding, to the discharge lamp until a predetermined condition is met after the startup of the discharge lamp; and a main circuit for applying a voltage, transformed by the first winding, to the discharge lamp after the predetermined condition has been met.

Furthermore, the discharge lamp lighting device according to the present invention is characterized in that the auxiliary circuit includes: a diode connected to one end of the second winding; a capacitor, connected to a cathode of the diode, for supplying a charged voltage to the discharge lamp; and a switch connected to the cathode of the diode and the capacitor.

Moreover, the discharge lamp lighting device according to the present invention is characterized in that the main circuit includes: a diode connected to the other end of the second winding and one end of the first winding, the first winding and the second winding having a common output terminal; and a capacitor, connected to a cathode of the diode, for supplying a charged voltage to the discharge lamp.

Besides, the discharge lamp lighting device according to the present invention is characterized by further including: a diode connected to an output of the main circuit; and a diode connected to an output of the auxiliary circuit, wherein a cathode of the diode, connected to the output of the main circuit, and a cathode of the diode, connected to the output of the auxiliary circuit, are connected to each other.

In addition, the discharge lamp lighting device according to the present invention is characterized in that the diode, connected to the output of the main circuit, and the diode, connected to the output of the auxiliary circuit, meet rated specifications for withstanding a high voltage to inhibit a high voltage generated by an igniter.

Further, the discharge lamp lighting device according to the present invention is characterized in that the switch is turned ON at the startup of the discharge lamp to supply power from the auxiliary circuit to the discharge lamp, and the switch is turned OFF after the predetermined condition has been met.

Furthermore, the discharge lamp lighting device according to the present invention is characterized in that: the predetermined condition requires a lapse of a predetermined period of time; the auxiliary circuit is configured to apply the voltage, transformed by the first winding and the second winding, to the discharge lamp until the predetermined period of time has elapsed after the startup of the discharge lamp; and the main circuit is configured to apply the voltage, transformed by the first winding, to the discharge lamp after the predetermined period of time has elapsed.

Moreover, the discharge lamp lighting device according to the present invention is characterized in that: the predetermined condition requires a voltage of a capacitor of the main circuit to be equal to or lower than a predetermined voltage value; the auxiliary circuit is configured to apply the voltage, transformed by the first winding and the second winding, to the discharge lamp until the voltage of the capacitor of the main circuit becomes equal to or lower than the predetermined voltage value after the startup of the discharge lamp; and the main circuit is configured to apply the voltage, transformed by the first winding, to the discharge lamp after the voltage of the capacitor of the main circuit has become equal to or lower than the predetermined voltage value.

Besides, the discharge lamp lighting device according to the present invention is characterized in that: the predetermined condition requires a current for the discharge lamp to be equal to or higher than a predetermined current value; the auxiliary circuit is configured to apply the voltage, transformed by the first winding and the second winding, to the discharge lamp until the current for the discharge lamp becomes equal to or higher than the predetermined current after the startup of the discharge lamp; and the main circuit is configured to apply the voltage, transformed by the first winding, to the discharge lamp after the current for the discharge lamp has become equal to or higher than the predetermined current.

In addition, the discharge lamp lighting device according to the present invention is characterized by further including: means for turning OFF the switch when an electrical quantity for the discharge lamp has exceeded a predetermined value within the predetermined period of time from the startup of the discharge lamp; and means for turning ON the switch again when the electrical quantity for the discharge lamp has exceeded a value different from the predetermined value after the switch has been turned OFF by the above means.

Furthermore, the present invention is characterized by being a projector including any one of the foregoing discharge lamp lighting devices.

In the present invention, a transformer and a signal transmission element are provided in order to ensure insulation between a primary side circuit section connected to a power supply, and a secondary side circuit section for applying a voltage to a discharge lamp. A detection circuit section, provided in the secondary side circuit section, detects an output voltage and an output current of the discharge lamp to detect a current deviation so as to obtain a predetermined power. A signal corresponding to the deviation, which has been detected by the detection circuit section, is transmitted to the primary side circuit section via the signal transmission element such as a photocoupler provided between the primary side circuit section and the secondary side circuit section. Further, since a switching control section, provided in the primary side circuit section, carries out switching control for constant power lighting based on the signal transmitted from the signal transmission element, the control can be carried out based on the detection of both of the lamp current and lamp voltage, and more elaborate power control is enabled, e.g., at the end of the life span of the lamp, for instance. Furthermore, since the secondary side circuit section is insulated from the primary side circuit section connected to the power supply, an electric shock of the discharge lamp due to the primary side power supply can be eliminated, and there is achieved a reduction in insulation distance to make it possible to realize the size reduction of the device. The lamp is fixed to a cup-shaped structure called a "reflector" for concentrating an output light, and if this reflector is made of a conductive metal such as aluminum, for example, an insulating structure is unnecessary when the lamp is located at the secondary side, which is advantageous for the size reduction.

Moreover, in order to light a discharge lamp, it is necessary to generate a high voltage, and to cause the discharge lamp to change to breakdown and glow discharge. Therefore, a converter has to cover a wide range of voltage, and each electric element or the like used for the converter is required to be able to withstand a high voltage, which consequently makes it difficult to achieve the size reduction of the device, and might further cause an impediment to the efficiency improvement of the converter.

Therefore, in the present invention, furthermore, a secondary side winding of the transformer includes a first winding and a second winding, and the secondary side circuit section includes a main circuit and an auxiliary circuit. The auxiliary circuit applies the voltage, transformed by the first winding and the second winding, to the discharge lamp until a predetermined condition is met from the startup of the discharge lamp. For example, this auxiliary circuit includes: a diode connected to one end of the second winding; a capacitor, connected to a cathode of the diode, for supplying a charged voltage to the discharge lamp; and a switch connected to the cathode of the diode and the capacitor. For example, this switch shuts off the power supply to the discharge lamp via the capacitor after a lapse of a predetermined period of time from the startup of the discharge lamp.

The main circuit applies the voltage, transformed by the first winding, to the discharge lamp after the predetermined condition has been met. For example, this main circuit includes: a diode connected to the other end of the second winding and one end of the first winding, the first winding and the second winding having a common output terminal; and a capacitor connected to a cathode of the diode, and supplies a voltage, charged into the capacitor, to the discharge lamp after a lapse of a predetermined period of time, for example.

In the present invention, when an electrical quantity for the discharge lamp has exceeded a predetermined value within the predetermined period of time from the startup of the discharge lamp, the discharge lamp lighting device turns OFF the switch. In other words, when a current flowing through the discharge lamp has is become equal to or higher than a predetermined value, or a voltage applied to the discharge lamp has become equal to or lower than a predetermined voltage, it is determined that the lamp is changed to arc discharge, and the switch is turned OFF to allow switchover from the auxiliary circuit to the main circuit. Then, when the electrical quantity for the discharge lamp has exceeded a value different from the predetermined value after the switch has been turned OFF, the switch is turned ON again. In other words, when extinction has occurred in the discharge lamp due to a special arc or the like after the switchover to the main circuit, the switch is turned ON again to allow switchover to the auxiliary circuit.

Furthermore, in the present invention, a self-excited flyback converter is used in the primary side circuit section, and based on the signal transmitted from the secondary side circuit section, the switching control is carried out, and the constant power lighting of the discharge lamp is performed. In other words, the device is configured so as to carry out the constant power control of the discharge lamp using a combination of the primary side self-excited flyback converter and the secondary side detection circuit section for detecting a power deviation; therefore, the device can be configured using a single converter, thus making it possible to achieve the size reduction of the device. Moreover, since the constant power control is carried out by detecting a deviation from the target power in the secondary side circuit section, it is possible to decrease the influence caused by the ambient temperature of the discharge lamp lighting device and individual differences of the members, and to reduce the error of output power. Besides, it is also possible to suppress the influence of residual AC ripple which becomes a cause of a flicker in a projector in which a discharge lamp is used.

Effects of the Invention

In the present invention, the device is configured so that insulation between a primary side circuit section and a secondary side circuit section is provided by a transformer and a signal transmission element, and constant power control is carried out by a detection circuit section in the secondary side circuit section and a switching control section in the primary side circuit section; therefore, the secondary side circuit section is insulated from the primary side circuit section connected to a power supply, an electric shock of the discharge lamp due to the primary side power supply can be eliminated, and there is achieved a reduction in insulation distance to make it possible to realize the size reduction of the device. Further, since the constant power control is carried out by detecting the power based on the detection of both of the lamp current and lamp voltage in the secondary side circuit section, more elaborate power control is enabled, e.g., at the end of the life span of the lamp, for instance.

Furthermore, in the present invention, the device is configured so as to carry out the constant power control of the discharge lamp by using a combination of the primary side self-excited flyback converter and the secondary side detection circuit section for detecting a power deviation, thus making it possible to decrease the influence caused by the ambient temperature of the discharge lamp lighting device and individual differences of the members. Moreover, the output power error can be reduced by the power deviation detection at the secondary side. In addition, it is also possible to suppress the influence of residual AC ripple which becomes a cause of a flicker in a projector in which a discharge lamp is used. Besides, since the discharge lamp lighting device can be configured using a single converter, the size reduction of the device and the improvement of the power efficiency can be achieved.

In the present invention, the secondary side circuit section is constituted by the main circuit and the auxiliary circuit, and the auxiliary circuit applies the voltage, transformed by the first winding and the second winding, to the discharge lamp until the predetermined condition is met from the startup of the discharge lamp. Then, the main circuit applies the voltage, transformed by the first winding, to the discharge lamp after the predetermined condition has been met, thus making it possible to achieve the size reduction and the efficiency improvement of the converter.

In the present invention, when the electrical quantity for the discharge lamp has exceeded the predetermined value within the predetermined period of time from the startup of the discharge lamp, the discharge lamp lighting device turns OFF the switch. Thereafter, when the electrical quantity for the discharge lamp has exceeded the value different from the predetermined value after the switch has been turned OFF, the switch is turned ON again. Since the ON/OFF control of the switch is carried out based on the electrical quantity and time of the discharge lamp in this manner, the quantity of current flowing through an FET and the like can be reduced, and further size reduction can be achieved. Furthermore, the electrical quantity is monitored again after the switch has been turned OFF; therefore, the present invention has an excellent effect that, even when extinction has occurred in the discharge lamp due to a special arc or the like after the switchover to the main circuit, the voltage supply is carried out by the auxiliary circuit again, thus making it possible to further improve the reliability.

BRIEF DESCRIPTION OF THE DRAWINGS

FIG. 4 A characteristic graph showing current-voltage characteristics of a lamp.

FIG. 12 A circuit diagram showing a circuit configuration of a separately excited flyback switching control section.

FIG. 20 A block diagram showing a hardware configuration of a projector.

Figure 1:
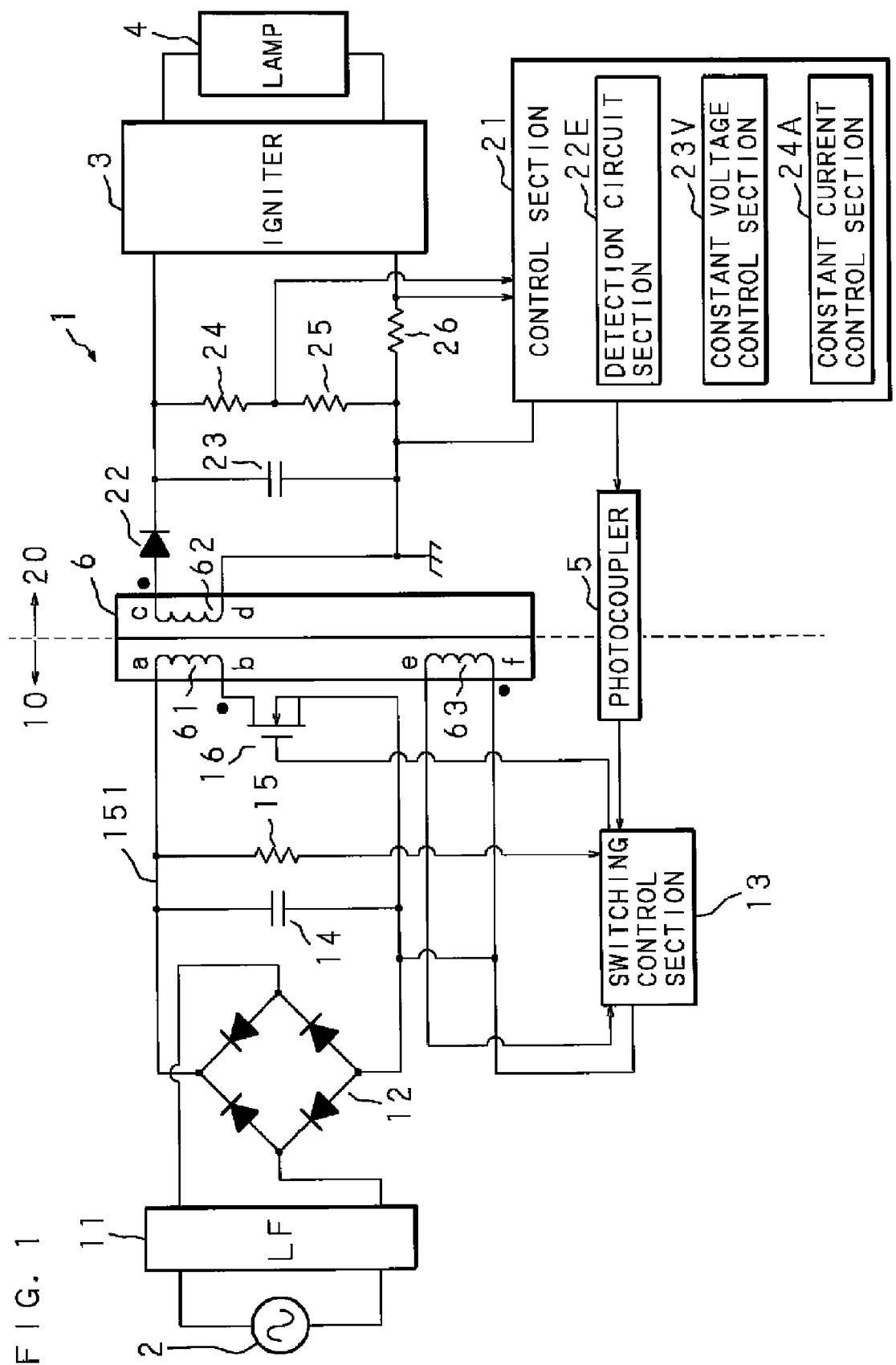
FIG. 1 A circuit diagram showing a configuration of a discharge lamp lighting device according to the present invention.

DESCRIPTION OF THE REFERENCE CHARACTERS 1 discharge lamp lighting device
2 alternating current power supply (power supply)
3 igniter
4 lamp (discharge lamp)
5 photocoupler (signal transmission element)
6 transformer
10 primary side circuit section
11 line filter
13 switching control section 15 startup resistor
16 power switch element
20 secondary side circuit section
21 control section
22 rectifier diode
23 capacitor
22E detection circuit section
23V constant voltage control section
24 first voltage divider resistor
24A constant current control section
25 second voltage divider resistor
26 current detection resistor
30 diode
61 primary coil
62 secondary coil
63 feedback coil
70 main converter
71 auxiliary converter
72 rectifier diode
73 capacitor
74 switch
300 projector
621 first winding
622 second winding

BEST MODE FOR CARRYING OUT THE INVENTION

Embodiment 1

Hereinafter, an embodiment of the present invention will be described with reference to the drawings. FIG. 1 is a circuit diagram showing a configuration of a discharge lamp lighting device according to the present invention. In FIG. 1, 1 denotes the discharge lamp lighting device, and the discharge lamp lighting device 1 is configured to include: a primary side circuit section 10; a secondary side circuit section 20; an igniter 3; and a lamp 4. The primary side circuit section 10 is connected to an alternating current power supply 2 via a line filter 11. The secondary side circuit section 20 is insulated from the primary side circuit section 10 by means of a voltage transformer 6 (hereinafter, called a "transformer 6") and a photocoupler 5 serving as a signal transmission element. It should be noted that, in the present embodiment, there is shown an example in which the present invention is applied to a discharge lamp lighting device for lighting a discharge lamp such as a metal halide lamp used in a liquid crystal projector or the like.

For the primary side circuit section 10, for example, a self-excited flyback converter (RCC: Ringing Choke Converter) is used. This primary side circuit section 10 is connected to the alternating current power supply 2 via the line filter 11, and is configured to include: a bridge circuit 12 and a smoothing capacitor 14 for full-wave rectifying and smoothing an alternating current from the alternating current power supply 2; a power switch element 16 provided by using an FET (Field Effect Transistor) or a bipolar transistor; a switching control section 13 for controlling the power switch element 16; and a startup resistor 15 connected thereto. The transformer 6 includes: a primary coil 61 whose one end is connected to the power switch element 16; a secondary coil 62; and a feedback coil 63 connected to the switching control section 13, and steps up and steps down the voltage by controlling the power switch element 16 with the switching control section 13. Further, the switching control section 13 is also connected to the photocoupler 5 for transmitting a control signal from the secondary side circuit section 20.

Next, how the primary side circuit section 10 is operated will be described. An unshown switch for the entire system is inserted in series into a connection line of the alternating current power supply 2 and the line filter 11, for example. When this system switch is in an OFF state, the power from the alternating current power supply 2 is not supplied to the discharge lamp lighting device 1, the switching control section 13 is not operated, and the power switch element 16 is in an OFF state since a gate voltage Vgs thereof is zero volt. When the system switch is turned ON and power is supplied from the alternating current power supply 2, the alternating current voltage therefrom is rectified and smoothed by the bridge circuit 12 and the smoothing capacitor 14. Then, the voltage of a line 151 is increased, the power is supplied via the startup resistor 15 to the switching control section 13 to start the operation thereof, and furthermore, a gate voltage will be applied to the power switch element 16. When the gate voltage Vgs of the power switch element 16 becomes equal to or higher than a predetermined voltage, the power switch element 16 is turned ON.

When the power switch element 16 is turned ON, a current flows through the primary coil 61, and a voltage is generated between both terminals "a" and "b" thereof. It should be noted that an "a" side of the primary coil 61 is a positive terminal. Similarly, a voltage is also generated at the secondary coil 62 and the feedback coil 63 in accordance with the turns ratios thereof. It should be noted that the feedback coil 63 and the primary coil 61 have the same polarity, while an "e" side of the feedback coil 63 is a positive terminal, and a "d" side of the secondary coil 62 is a positive terminal. The positive terminal ("e" side) of the feedback coil 63 is connected to the gate of the power switch element 16 via the switching control section 13. That is, when the power switch element 16 is ON, it is connected to the side of the feedback coil 63, is the polarity of which maintains the ON state.

Figure 2:
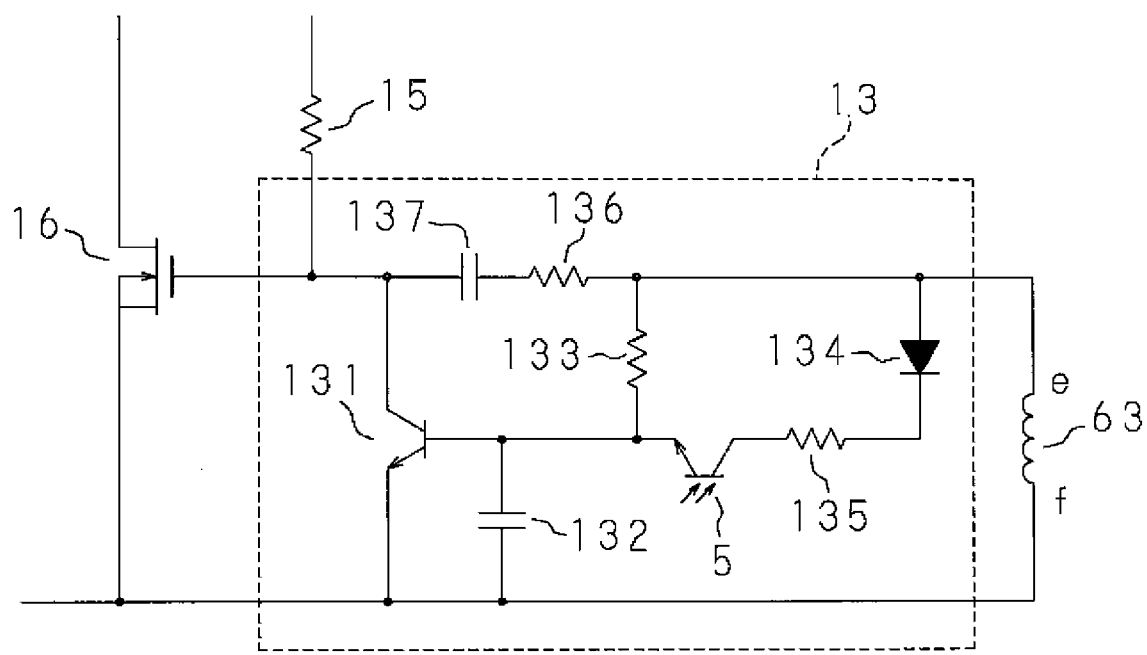
FIG. 2 A circuit diagram showing a circuit configuration of a switching control section.

FIG. 2 is a circuit diagram showing a circuit configuration of the switching control section 13. The switching control section 13 is configured to include a switching element 131, capacitors 132, 137, resistors 133, 135, 136, and a diode 134. It should be noted that 5 in this diagram denotes a light receiving element of a photocoupler. The gate of the power switch element 16 is operated by application of a voltage generated in the feedback coil 63 thereto via the resistor 136 and the capacitor 137. Once the power switch element 16 has been turned ON by the startup resistor 15, a positive voltage is generated at the "e" side of the feedback coil 63, thus maintaining the ON operation of the power switch element 16. Further, the gate of the power switch element 16 is controlled by the switch element 131. The ON/OFF operation of the switch element 131 is controlled by the voltage of both ends of the capacitor 132. The voltage of the capacitor 132 is controlled by a current flowing through the resistor 133 due to a voltage generated at the "e" side of the feedback coil 63. Specifically, a positive voltage is generated at the "e" side of the feedback coil 63 to turn ON the power switch element 16; however, since the capacitor 132 is charged with electric charges via the resistor 133, the switch element 131 is changed from the OFF state to the ON state, and the gate of the power switch element 16 has the same potential as the drain thereof, thus changing it to the OFF state. A period of time during which the power switch element 16 is in the ON state is determined by a time constant of the resistor 133 and the capacitor 132. The constant is adjusted so that a desired power can be obtained. Furthermore, the capacitor 132 is also charged by the diode 134, the resistor 135 and the photocoupler 5. When the photocoupler 5 is frequently turned ON, the charging of the capacitor 132 is expedited, and a period of time required for the switch element 131 to be changed from ON to OFF is also shortened. The photocoupler 5 is controlled from the secondary side circuit section 20 described later.

Subsequently, an operation in which the switch is changed from OFF to ON will be described. At the instant when the power switch element 16 is turned OFF, a positive voltage is generated at a "c" side of the secondary coil 62, and the power accumulated in the transformer 6 while the power switch element 16 is ON is outputted via a high voltage rectifier diode 22 of the secondary side circuit section 20. When the power of the transformer has become zero, the residual power causes a positive voltage to be generated at the "e" side of the feedback coil 63, and as a result, the switch is turned ON again. The switching control section 13 repeatedly carries out the above-described ON/OFF control.

Next, a configuration of the secondary side circuit section 20 will be described. The secondary side circuit section 20 is configured to include: the rectifier diode 22; a secondary side smoothing capacitor 23; a first voltage divider resistor 24 and a second voltage divider resistor 25 for lamp voltage detection; a current detection resistor 26 for lamp current detection; and a control section 21 including a detection circuit section 22E, a constant voltage control section 23V and a constant current control section 24A. The high voltage rectifier diode 22 is connected to the "c" side of the secondary coil 62, a voltage supplied via the secondary coil 62 and the high voltage rectifier diode 22 is smoothed by the secondary side smoothing capacitor 23, and then the smoothed voltage is applied to the lamp 4. It should be noted that the "d" side of the secondary coil 62 is grounded.

The first voltage divider resistor 24 and the second voltage divider resistor 25 are connected in parallel to the lamp 4, and the detected lamp voltage is outputted to the control section 21. Further, the current detection resistor 26 is connected in series to the lamp 4, and the detected lamp current is outputted to the control section 21. The igniter 3 causes an inrush current to flow through the lamp 4, and causes the lamp 4 to be changed to arc discharge. After the arc discharge has been maintained and the lamp 4 has been changed to a steady state, the constant power control of the lamp 4 is carried out by the detection circuit section 22E of the control section 21 and the switching control section 13; furthermore, when the lamp voltage, detected by the first voltage divider resistor 24 and the second voltage divider resistor 25, is equal to or higher than a predetermined voltage, the lamp voltage is controlled so as to be equal to or lower than the predetermined voltage by the constant voltage control section 23V, and when a current equal to or higher than a predetermined current is outputted from the current detection resistor 26, the lamp current is controlled so as to be equal to or lower than the predetermined current by the constant current control section 24A.

Figure 3:
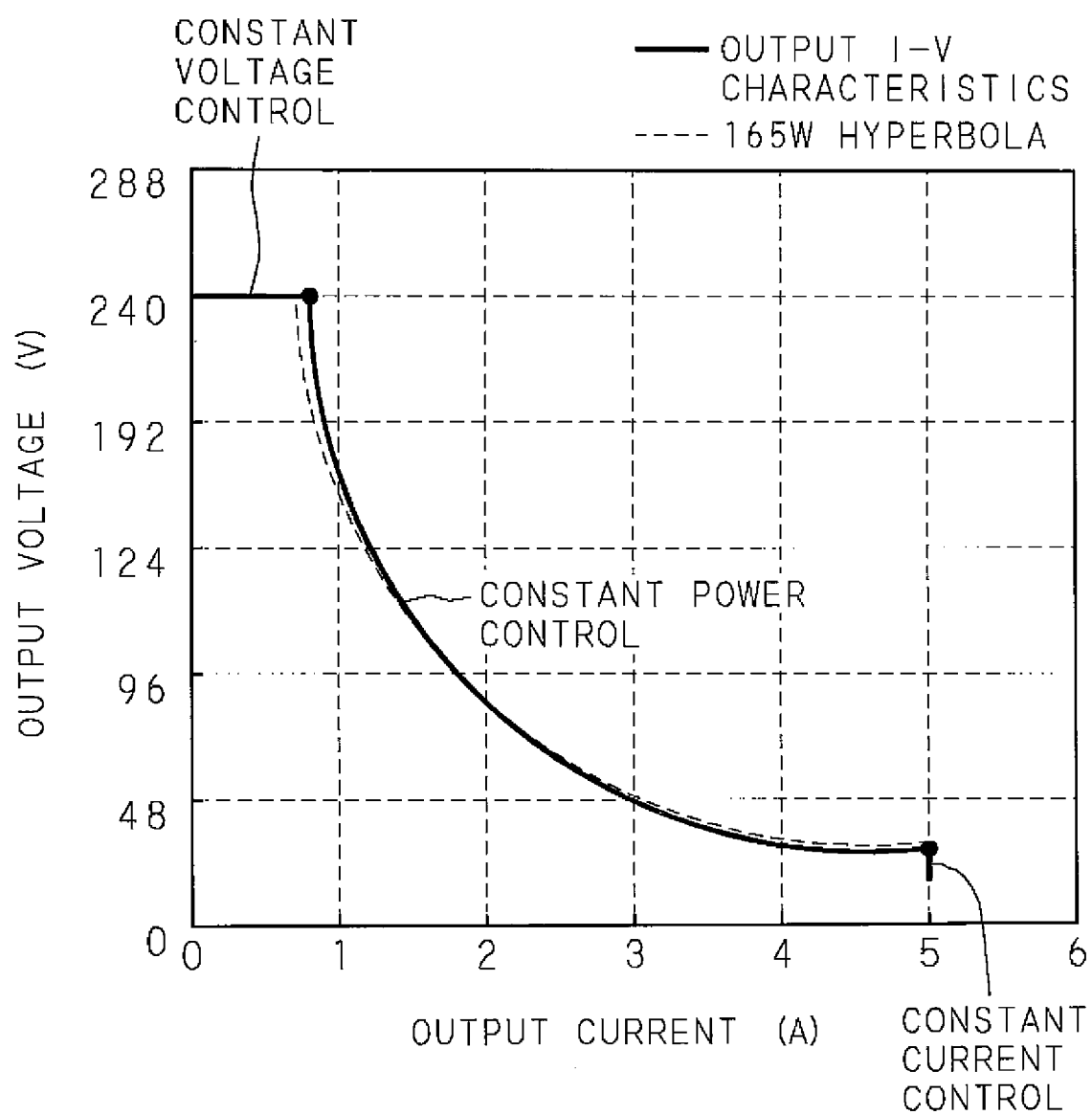
FIG. 3 A graph showing output characteristics of the discharge lamp lighting device.

FIG. 3 is a graph showing output characteristics of the discharge lamp lighting device. The vertical axis represents the output voltage of the lamp 4, which is expressed in the unit [V (volt)], while the horizontal axis represents the output current of the lamp 4, which is expressed in the unit [A (ampere)]. In the graph of FIG. 3, the solid line indicates the output current-voltage characteristics of the lamp 4, the dotted line indicates the current-voltage characteristics concerning the target power, and the discharge lamp lighting device 1 according to the present invention carries out control by the control section 21 and the switching control section 13 so that the output current-voltage characteristics conform to the target power indicated by the dotted line. It should be noted that, in the present embodiment, description is made on the supposition that the open-circuit voltage is 240 V, the voltage is 15 V at the time of initial arc discharge, and the voltage is 60 V at the time of steady arc discharge, while the target power is 165 W; however, they may be appropriately changed in accordance with the characteristics of the lamp 4.

As shown in the graph of FIG. 3, when the lamp current has become equal to or higher than the predetermined current (for example, equal to or higher than 5 A) in a transient state of the startup of the lamp 4 such as at the time of the initial arc discharge, the constant current control is carried out by the constant current control section 24A so that the current is kept constant (at 5 A, for example). Further, when the lamp 4 is in an extinguished state, i.e., when both electrodes of the lamp 4 are in an open state, the constant voltage control is carried out by the constant voltage control section 23V so that the output voltage is kept constant (at 240 V, for example). Furthermore, in a steady lighting state of the lamp 4, the output is controlled so that the product of the voltage of both ends of the lamp 4 and the current flowing through the lamp 4 is kept constant. The detection circuit section 22E compares the present power, calculated from the detected lamp voltage and lamp current, with the target power, and controls the power switch element 16 via the photocoupler 5 and the switching control section 13 so as to decrease the power difference. The target power is determined by the specifications unique to the lamp to be used, and is 100 W or 250 W, for example. In a general discharge lamp, for example, the lamp voltage is 60 V at the time of initial lighting, and becomes 90 V at the end of the life span. In such a case, the current flowing through the lamp 4 is controlled to achieve the constant power. For example, in the case of a 180 W discharge lamp, the current is controlled to 3 A at 60 V, and 2 A at 90 V. By carrying out the constant current control, the constant voltage control and constant power control in the secondary side circuit section 20 in this manner, even at the end of the life span of the lamp 4, for example, more elaborate control of the lamp 4 can be carried out as compared with the case where only an RCC converter is used.

FIG. 4 is a characteristic graph showing current-voltage characteristics of the lamp 4, schematically describing how they change with time from the extinguished condition to the lighting start and the lighting stabilization. The vertical axis represents the voltage generated at both ends of the lamp 4, expressed in the unit [V (volt)], while the horizontal axis represents the current flowing through the lamp 4, expressed in the unit [A (ampere)]. Before the lamp 4 is lit (i.e., before the discharge lamp lighting device 1 is operated), the current is 0 (zero) A, and the voltage is 0 (zero) V determined by the output state of the RCC converter. Upon start of the operation of the discharge lamp lighting device 1, a voltage of 250 V shown in FIG. 3 is generated at both ends of the capacitor 23, and upon reception of this voltage, the igniter 3 is operated to generate, in the lamp 4, a voltage as high as several kV to several tens of kV, which is applied to the lamp 4. In the lamp 4, breakdown occurs due to the high voltage, and a current starts to flow. In an initial lighting state, the lamp 4 is lit in a mode called "glow discharge". As shown in FIG. 4, the lamp voltage at this time is approximately 100 V to 200 V, and the lamp current is approximately 1 A. The lamp 4 is changed from a glow lighting mode to an initial arc lighting mode when it is supplied with sufficient power. At this time, the characteristic of the lamp 4 enters a state called "negative resistance", in which a current flows unlimitedly. Hence, the current is limited by means of the constant current control characteristic shown in FIG. 3. While undergoing the initial arc lighting, the lamp 4 generates heat, and the lamp voltage starts to increase. The discharge lamp lighting device 1 detects this lamp voltage variation, and is changed from the constant current control to the constant power control. In the constant power control, the flowing current is reduced in accordance with the increase in the lamp voltage. As a result, as shown in FIG. 4, the operating point of the lamp 4 moves.

Figure 5:
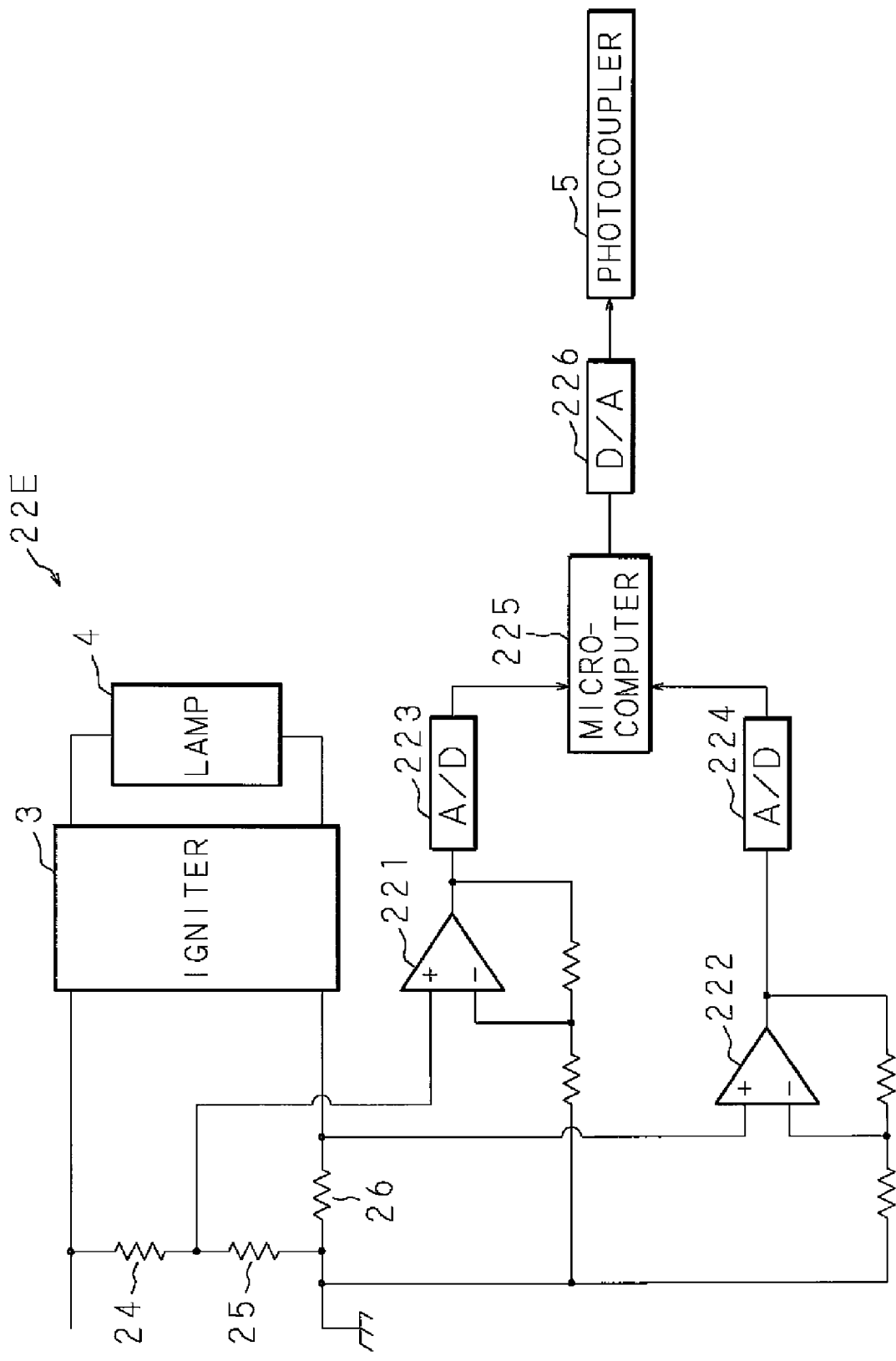
FIG. 5 A block diagram showing a circuit configuration of a detection circuit section.

FIG. 5 is a block diagram showing a circuit configuration of the detection circuit section 22E. The detection circuit section 22E serves as a circuit that compares a lamp power, determined by the lamp voltage and lamp current, with a predetermined target power (which is 165 W in the present embodiment) to output the resulting deviation to the photocoupler 5, and the detection circuit section 22E of the type in which a microcomputer is included as shown in FIG. 5, for example, is used. The detection circuit section 22E is configured to include: a voltage detection noninverting amplifier 221; a current detection noninverting amplifier 222; A/D (analog-digital) converters 223, 224; a microcomputer 225; and a D/A (digital-analog) converter 226.

The voltage detection noninverting amplifier 221 is connected to the first voltage divider resistor 24 and the second voltage divider resistor 25 for lamp voltage detection, and amplifies the lamp voltage, divided by the first voltage divider resistor 24 and the second voltage divider resistor 25, with a predetermined amplification factor. The lamp voltage, which has been amplified, is digitized by the A/D converter 223 connected to an output terminal of the voltage detection noninverting amplifier 221, and is then inputted to the microcomputer 225.

The current detection noninverting amplifier 222 is connected to the current detection resistor 26 for lamp current detection (such as a high-precision 50 mΩ resistor, for example), and amplifies the current, converted by the current detection resistor 26, with a predetermined amplification factor. The voltage, concerning the amplified lamp current, is digitized by the A/D converter 224 connected to an output terminal of the current detection noninverting amplifier 222, and is then inputted to the microcomputer 225. The microcomputer 225 includes a processor and a memory that are not shown, and stores a predetermined target power Pexp serving as a target. The processor of the microcomputer 225 multiplies the values concerning the lamp voltage and the lamp current outputted from the A/D converters 223 and 224 to calculate a lamp power Pdet.

The processor of the microcomputer 225 calculates a deviation between the target power Pexp read from the memory, and the calculated lamp power Pdet, and outputs a manipulated signal, obtained by multiplying the calculated deviation by a negative gain, to the D/A converter 226 connected to the output side of the microcomputer 225. The D/A converter 226 changes the manipulated signal to analog form, and outputs it to the photocoupler 5.

As shown in FIG. 1, the photocoupler 5, which ensures insulation between the primary side circuit section 10 and the secondary side circuit section 20, is connected to the switching control section 13, and transmits the manipulated signal, which corresponds to the deviation, to the switching control section 13. When the lamp power Pdet is higher than the target power Pexp, i.e., when the deviation is positive, a negative manipulated signal is outputted from the photocoupler 5, and upon reception of this signal, the switching control section 13 controls the primary side circuit section 10 so as to reduce the power supplied to the lamp 4. On the other hand, when the lamp power Pdet is lower than the target power Pexp, i.e., when the deviation is negative, a positive manipulated signal is outputted from the photocoupler 5, and upon reception of this signal, the switching control section 13 controls the primary side circuit section 10 so as to increase the power supplied to the lamp 4. When the deviation has become 0 due to this feedback control, the response of the detection circuit section 22E and the switching control section 13 is stopped, and a transition is made to the steady state again.

Figure 6:
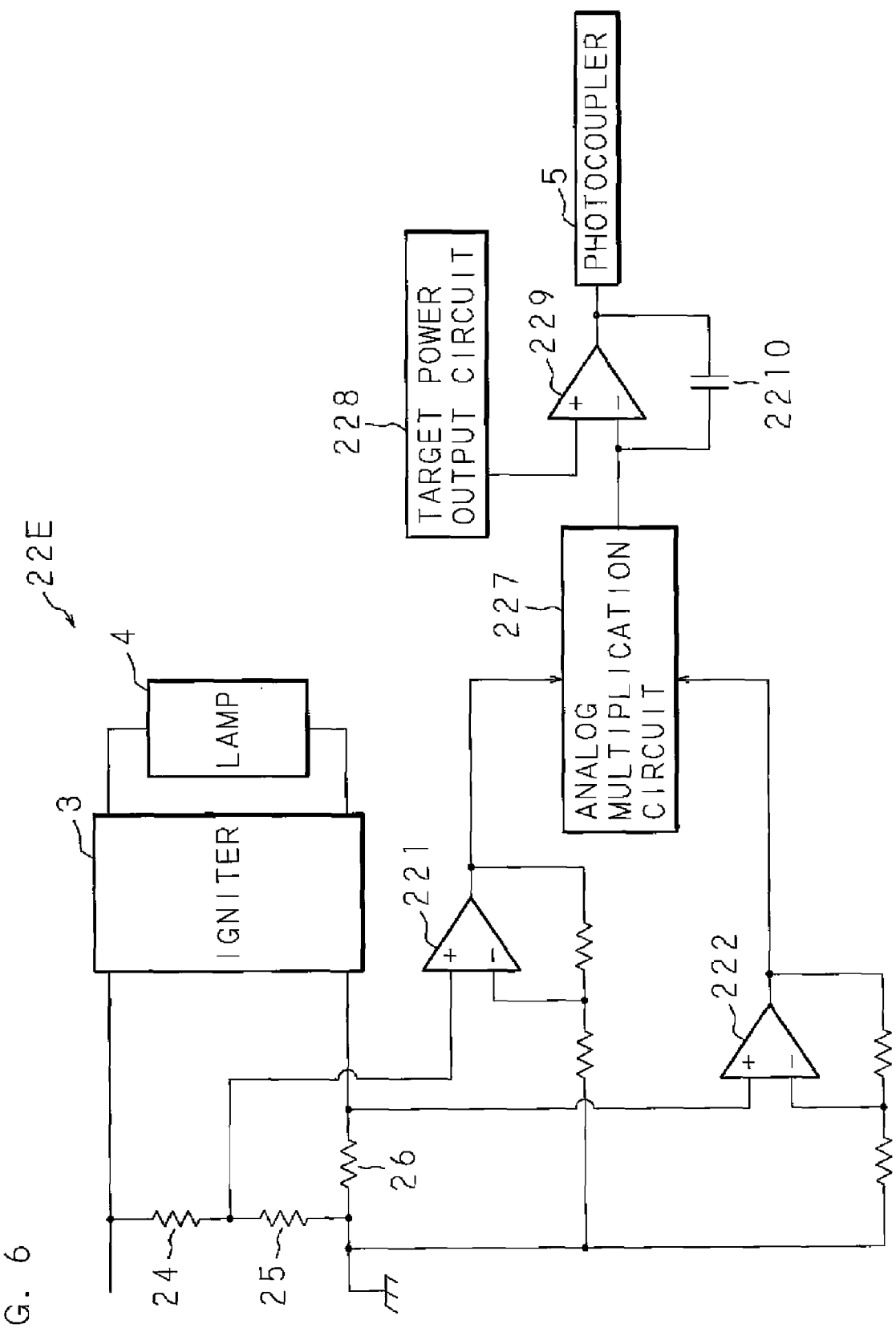
FIG. 6 A block diagram showing a circuit configuration of the detection circuit section in which an analog multiplication circuit is used.

The detection circuit section 22E is not limited to the above-mentioned configuration as long as it detects a deviation between the target power Pexp and the lamp power Pdet as described with reference to FIG. 5, and may be implemented using an analog multiplication circuit, for example. FIG. 6 is a block diagram showing a circuit configuration of the detection circuit section 22E in which an analog multiplication circuit is used. The detection circuit section 22E is configured to include: a voltage detection noninverting amplifier 221; a current detection noninverting amplifier 222; an analog multiplication circuit 227; a target power output circuit 228; and an error amplifier 229. The analog multiplication circuit 227 is connected to output terminals of the voltage detection noninverting amplifier 221 and the current detection noninverting amplifier 222, and multiplies the outputted lamp current by the lamp voltage to input the multiplied lamp power Pdet to an inverting input terminal of the error amplifier 229.

A noninverting input terminal of the error amplifier 229 is connected with the target power output circuit 228. The error amplifier 229 compares the target power Pexp, outputted from the target power output circuit 228, with the lamp power Pdet, and the error amplifier 229 absorbs a current equivalent to the deviation from its output terminal. The output terminal of the error amplifier 229 is connected to the cathode side of an unshown photodiode of the photocoupler 5, and an ON/OFF operation is performed in accordance with the current, absorbed into the output terminal, to transmit a signal corresponding to the deviation to the switching control section 13. The switching control section 13 carries out switching control until the deviation becomes 0 in accordance with the signal from the photocoupler 5.

Figure 7:
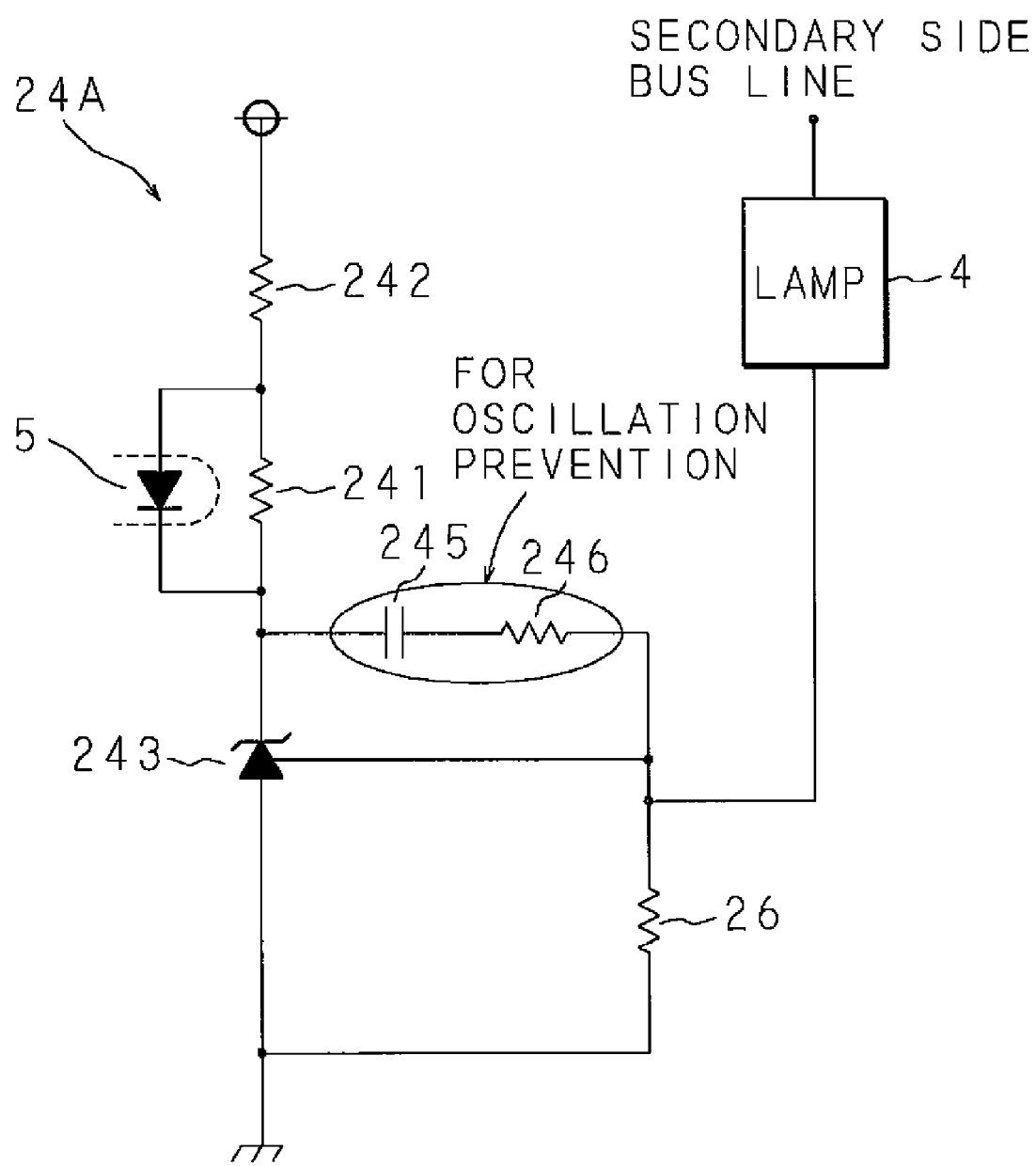
FIG. 7 A circuit diagram showing a circuit configuration of a constant current control section.

FIG. 7 is a circuit diagram showing a circuit configuration of the constant current control section 24A. The constant current control section 24A is configured to include: a current detection resistor 26 for lamp current detection; a shunt regulator 243; an oscillation prevention capacitor 245 for preventing oscillation; an oscillation prevention resistor 246; a first resistor 241 connected in parallel to the photocoupler 5; and a second resistor 242 connected in series to the first resistor 241. The second resistor 242 is connected, at one side thereof, with a constant voltage power supply of about 13 V. A secondary side bus line in this diagram refers to a portion that passes through the igniter 3 from the cathode side of the diode 22 to reach the upper side of the lamp 4 in FIG. 1, and that serves as a line through which power is supplied to the lamp. The lamp current flows through the lamp 4 from the secondary side bus line from the top to the bottom in FIG. 7, and then flows to the ground via the current detection resistor 26. The shunt regulator 243 compares a reference voltage Vref with a voltage Vr, which is obtained by multiplying the lamp current by a resistance value of the current detection resistor 26 for lamp current detection. When Vref is equal to Vr, a current flows through the cathode to operate the photocoupler 5. A signal is transmitted from the photocoupler 5 to the switching control section 13 to carry out the constant current control, resulting in a reduction in the lamp current. It should be noted that when the current limit value is 3 A, and the reference voltage Vref of the shunt regulator 243 is 2.5 V, the resistance value of the current detection resistor 26 may be 820 mΩ.

Figure 8:
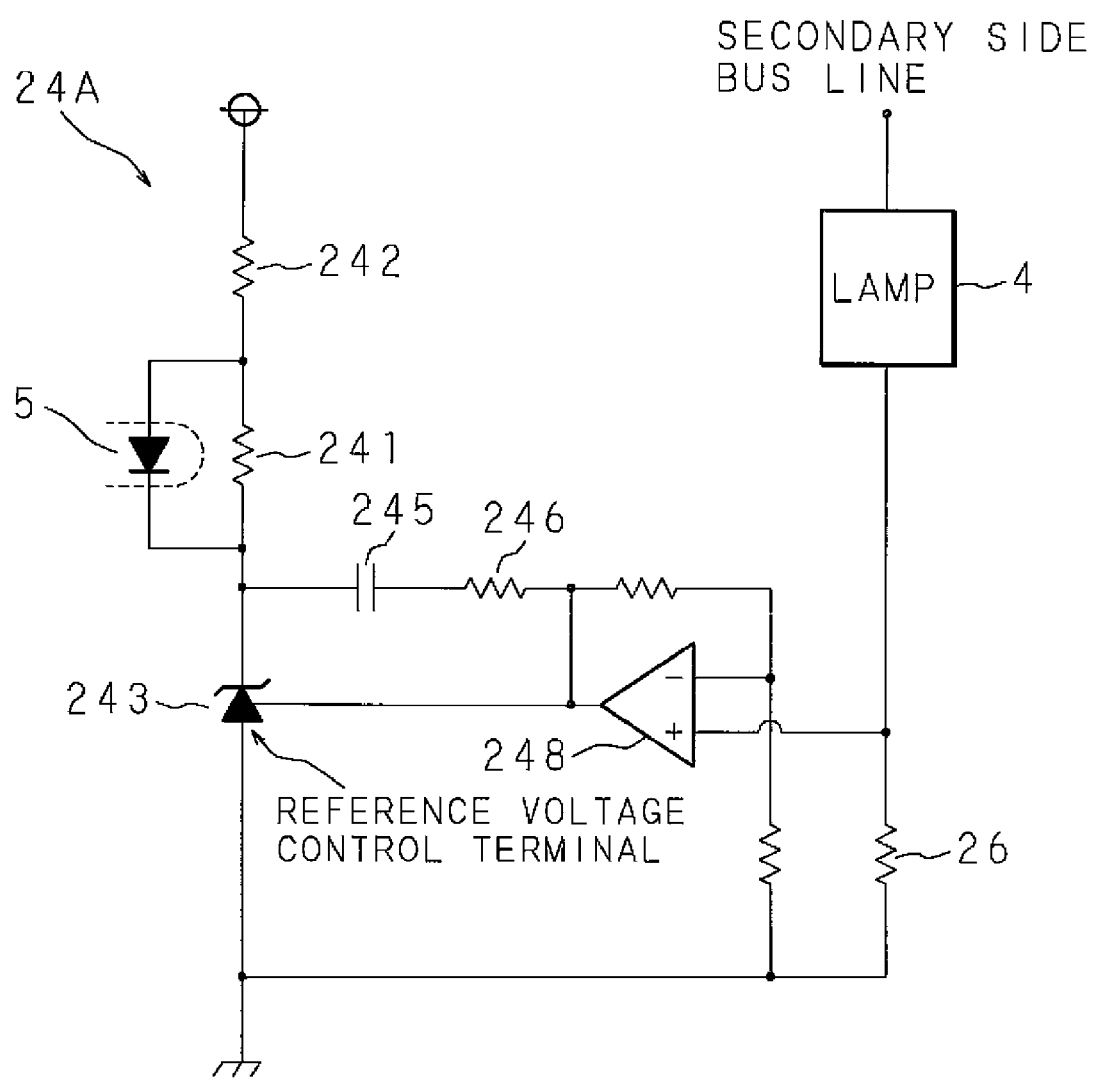
FIG. 8 A circuit diagram showing another circuit configuration of the constant current control section.

FIG. 8 is a circuit diagram showing another circuit configuration of the constant current control section 24A. The constant current control section 24A shown in FIG. 7 may be implemented by the circuit configuration shown in FIG. 8. As shown in FIG. 8, an operational amplifier 248 is interposed between the current detection resistor 26 and a reference voltage control terminal of the shunt regulator 243. The lamp current outputted from the current detection resistor 26 is inputted to a noninverting input terminal of the operational amplifier 248, and an amplification signal is outputted from an output terminal of the operational amplifier 248 to the reference voltage control terminal of the shunt regulator 243. In the circuit configuration of FIG. 7, when a maximum current of 3 A flows for a resistance value of 820 mΩ of the current detection resistor 26, a large resistor (approximately 7 W) will be needed. If it is difficult to adopt such a large resistor, the resistance value of the current detection resistor 26 may be reduced to one tenth, i.e., 82 mΩ, and may be amplified by the operational amplifier 248 (tenfold gain).

Figure 9:
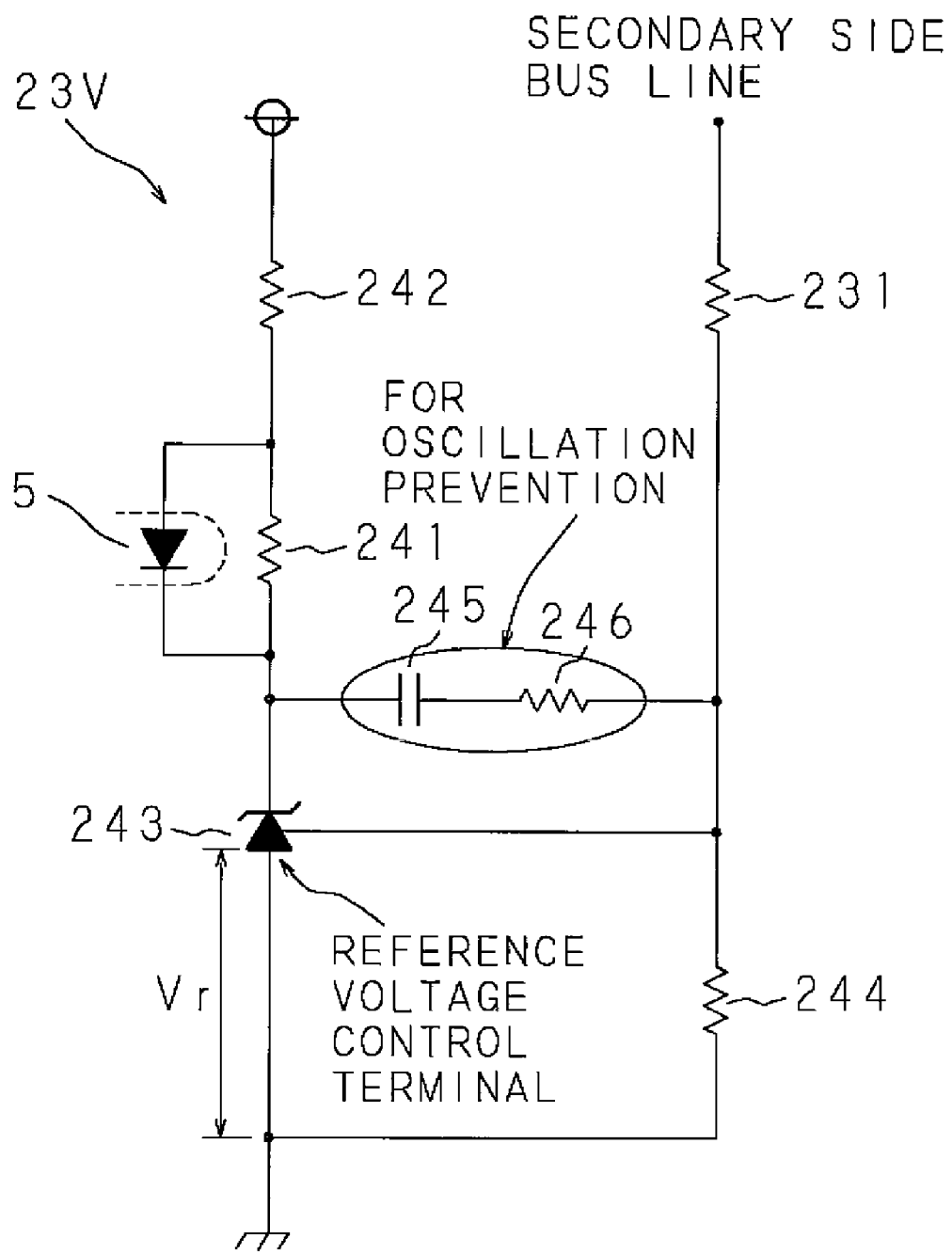
FIG. 9 A circuit diagram showing a circuit configuration of a constant voltage control section.

FIG. 9 is a circuit diagram showing a circuit configuration of the constant voltage control section 23V. The constant voltage control section 23V is configured to include: a shunt regulator 243; an oscillation prevention capacitor 245 for preventing oscillation; an oscillation prevention resistor 246; a first resistor 241 connected in parallel to the photocoupler 5; a second resistor 242 connected in series to the first resistor 241; and a third resistor 244 and a fourth resistor 231 which are provided on the secondary side bus line. A reference voltage control terminal of the shunt regulator 243 is connected with the third resistor 244, and the voltage of the reference voltage control terminal of the shunt regulator 243 is represented by Vr while the reference voltage is represented by Vref. When Vr<Vref no current flows through the cathode. On the other hand, when Vr>Vref, a current flows through the cathode to operate the photocoupler 5, and a signal is transmitted from the photocoupler 5 to the switching control section 13; as a result, the constant voltage control is carried out to reduce the voltage of the secondary side bus line, and Vr becomes equal to or lower than Vref. It should be noted that the photocoupler 5 shown in FIG. 5 to FIG. 8 may be used in common; for example, the cathode side of the photodiode of the photocoupler, which is to be used in common, is connected to the cathode side of the shunt regulator of each circuit block, thereby operating the above-described constant power control, constant voltage control and constant current control by OR logic.

Figure 10:
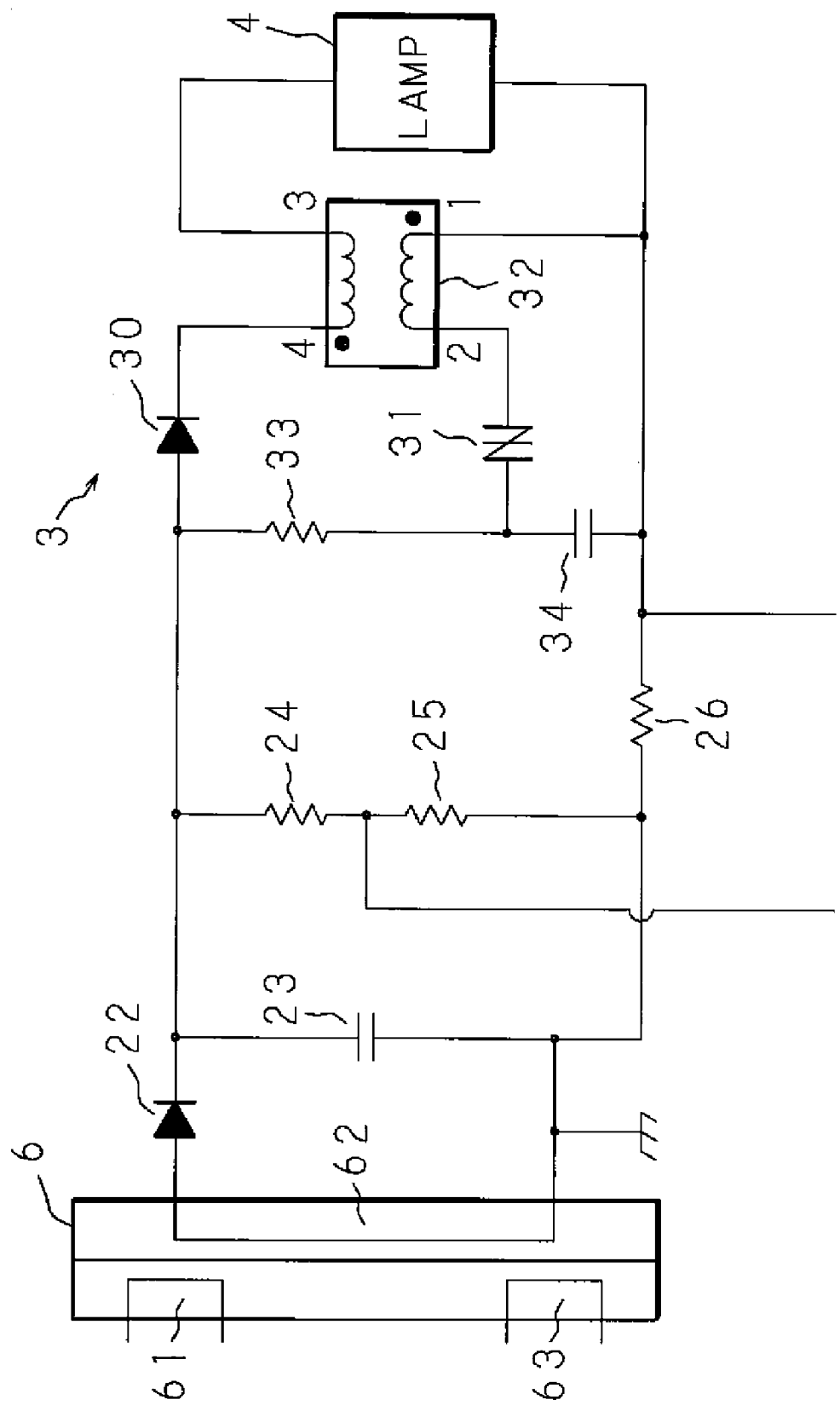
FIG. 10 A circuit diagram showing a secondary side of the discharge lamp lighting device, and an igniter.

FIG. 10 is a circuit diagram showing the secondary side of the discharge lamp lighting device 1, and the igniter 3. The igniter 3 includes: a SIDAC (registered trademark) 31, the ON/OFF control of which is switched by an applied voltage; a pulse transformer 32 to which one side of the SIDAC 31 is connected; a resistor 33 and a capacitor 34, by which the oscillation frequency of the SIDAC 31 is determined; and a high voltage diode 30 for inhibiting a high voltage, generated by the pulse transformer 32, from returning to the converter side. When the lamp 4 is extinguished, the two electrodes of the lamp 4 are in an insulated state. In this case, a voltage of about 240 V is generated at both ends of the capacitor 23. The SIDAC 31 has a characteristic that it is turned ON when a voltage of, for example, 220 V is applied to both ends thereof, and since a voltage of 240 V is generated at the capacitor 34 via the resistor 33, the SIDAC 31 is operated. In other words, when the lamp 4 is extinguished, the SIDAC 31 is operated. Upon operation of the SIDAC 31, electric charges accumulated in the capacitor 34 flow as a current between terminals 1-2 of the pulse transformer 32, and a voltage, generated in accordance with the turns ratios of the pulse transformer 32, flows between terminals 3-4 thereof. In this case, if the turns ratio is 1:200, for example, a voltage as high as about 5 kV is generated between the terminals 3-4 of the pulse transformer 32. Due to this high voltage, the lamp 4 causes breakdown so that a current starts to flow therethrough. When a current has started to flow through the lamp 4, the lamp voltage is reduced to be equal to or lower than 200 V; therefore, the voltage of both ends of the capacitor 34 becomes equal to or lower than 200 V similarly, and the ON operation of the SIDAC 31 is stopped. Hence, a current flows through the lamp 4 via the high voltage diode 30 and the terminals 3-4 of the pulse transformer 32.

Figure 11:
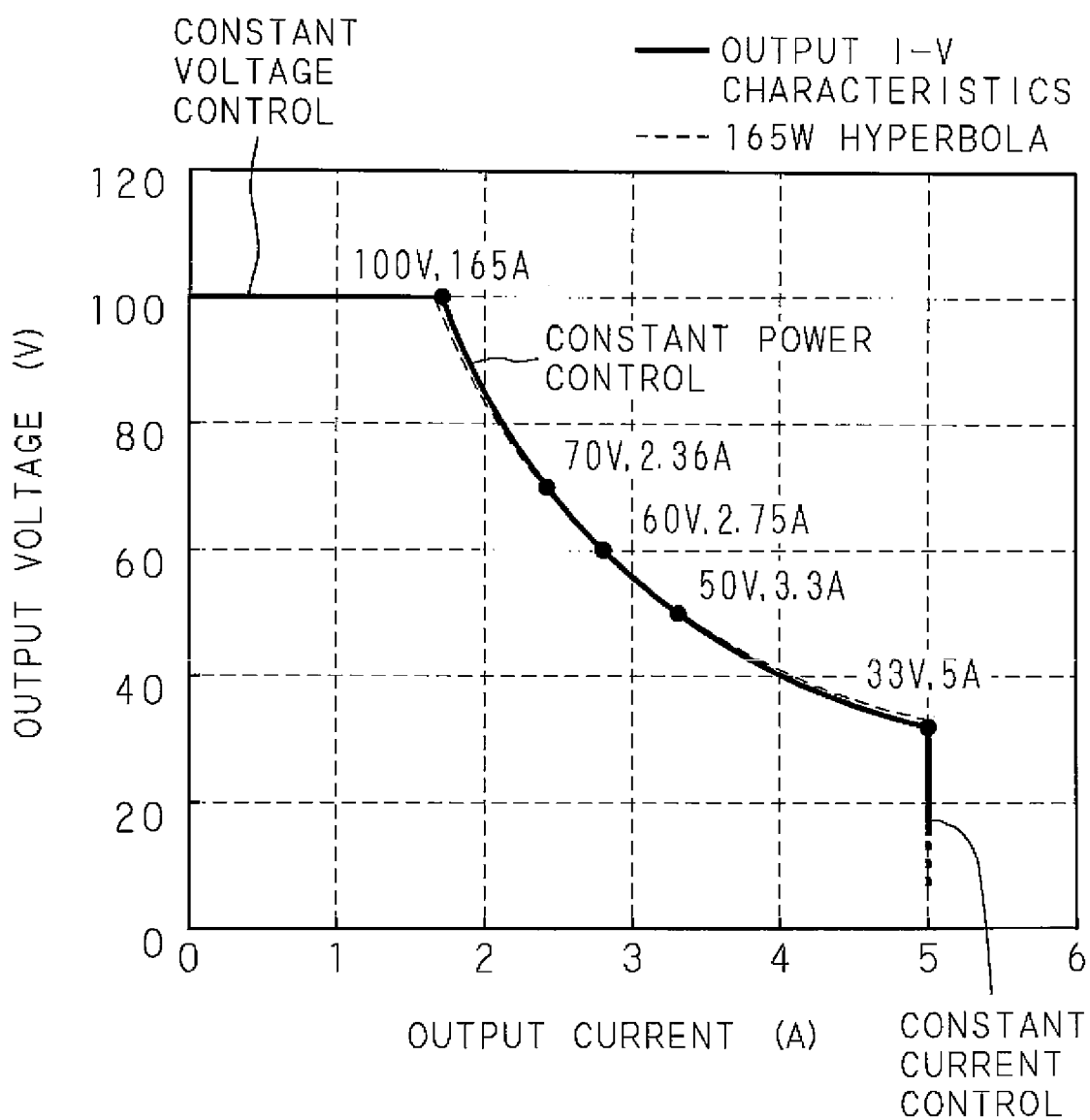
FIG. 11 A graph showing output characteristics according to another embodiment of the discharge lamp lighting device.

Since the secondary side circuit section 20 is insulated from the primary side circuit section 10 as described above, it is possible to achieve the safety of the secondary side circuit section 20, as well as the size reduction of the discharge lamp lighting device 1 and a projector or the like including this device. Further, since the control is carried out by detecting a deviation between the target power and the power of the lamp 4 in the detection circuit section 22E of the secondary side circuit section 20, more elaborate constant power control of the lamp 4 is enabled. It should be noted that the constant current control shown in FIG. 3 is indicated by a straight line, but may be indicated otherwise. Furthermore, the lamp current may be changed such that it becomes 2.5 A immediately after the lighting of the lamp 4, and then becomes 5 A. Moreover, although the constant power control is indicated by a hyperbola, but may alternatively be realized by straight-line approximation. FIG. 11 is a graph showing output characteristics according to another embodiment of the discharge lamp lighting device 1. The constant power control, constant voltage control and constant current control of the discharge lamp lighting device 1 may be realized in accordance with the output characteristics shown in FIG. 11. As shown in FIG. 11, the output characteristics are different from those of FIG. 3 in that the open-circuit voltage is 100V. For example, for a lamp operated at 60 V during rated operation, the open-circuit voltage is adjusted to 60 V, thus making it possible to achieve the size reduction and efficiency improvement of the transformer.

It should be noted that the switching control section 13 has been described based on the embodiment in which a self-excited flyback system is used as shown in FIG. 2; however, a separately excited flyback system may alternatively be used. FIG. 12 is a circuit diagram showing a circuit configuration of a separately excited flyback switching control section 13. A control circuit 2S1 for controlling the switching control section 13 is connected, via an input terminal Vcc thereof, to an auxiliary power supply 2S provided separately from the alternating current power supply 2, and is supplied with power from the auxiliary power supply 2S. An FRQ terminal of the control circuit 2S1 is connected with a capacitor to carry out the adjustment of frequency.

The phototransistor side of the photocoupler 5 is connected to an FB terminal of the control circuit 2S1, and the power switch element 16, connected thereto via a CTL terminal, is controlled based on the magnitude of the current outputted from the photocoupler 5. In other words, a PWM signal is outputted from the CTL terminal to turn ON/OFF the gate of the power switch element 16. During the period when the pulse is ON, the power switch element 16 is ON.

Embodiment 2

Figure 13:
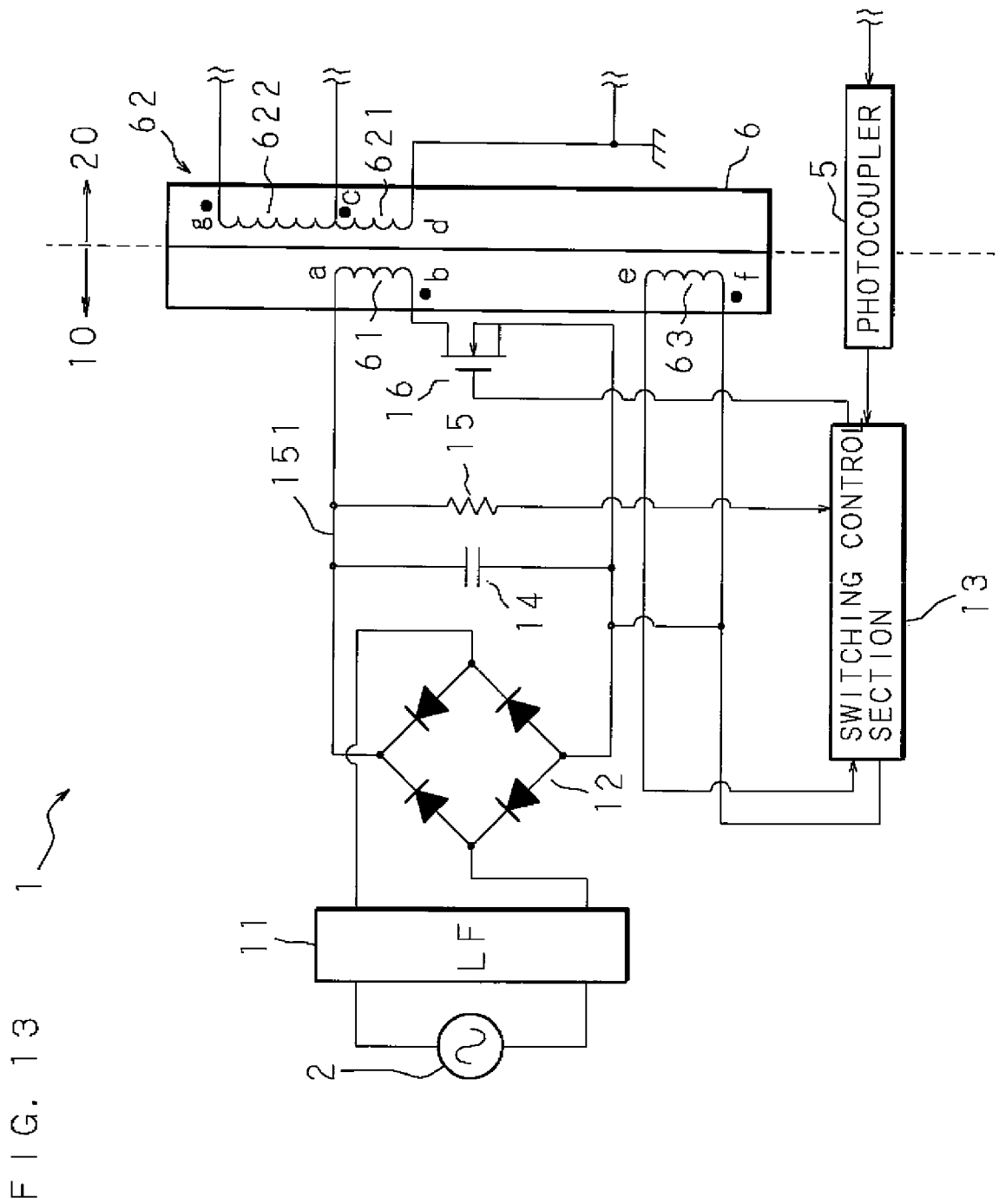
FIG. 13 A circuit diagram showing a configuration of a discharge lamp lighting device according to Embodiment 2.
Figure 14:
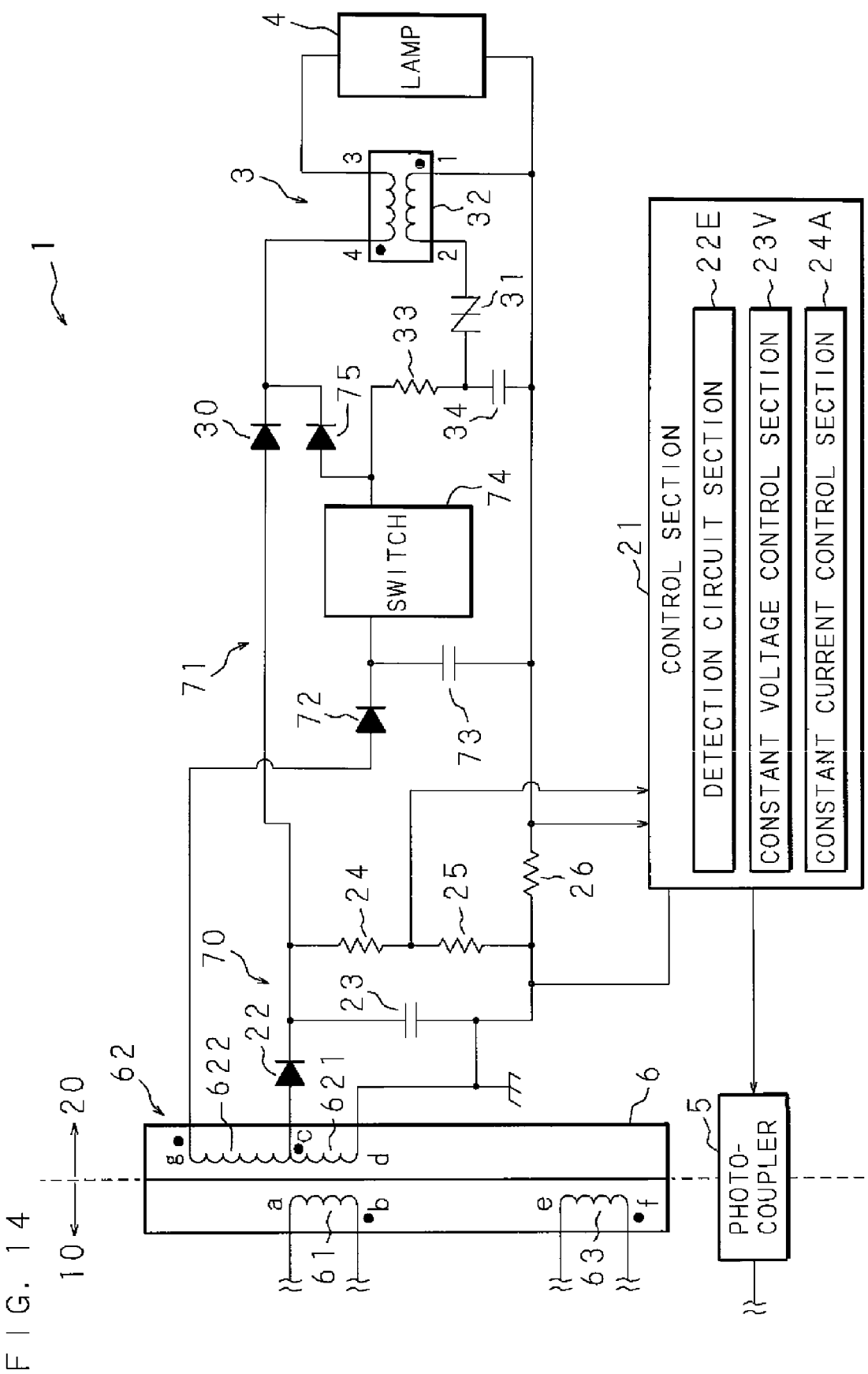
FIG. 14 A circuit diagram showing the configuration of the discharge lamp lighting device according to Embodiment 2.

FIG. 13 and FIG. 14 are circuit diagrams each showing a configuration of a discharge lamp lighting device according to Embodiment 2. In FIG. 13, 1 denotes the discharge lamp lighting device, and the discharge lamp lighting device 1 includes: a primary side circuit section 10 located in association with an alternating current power supply 2; and a secondary side circuit section 20 located in association with a lamp 4, the boundary of which is defined by a voltage transformer (hereinafter, called a "transformer") 6 and a photocoupler 5 serving as a signal transmission element. Thus, the secondary side circuit section 20 is insulated from the primary side circuit section 10 by means of the transformer 6 and the photocoupler 5. It should be noted that, in the present embodiment, there is shown an example in which the present invention is applied to a discharge lamp lighting device for lighting a discharge lamp such as a metal halide lamp used in a liquid crystal projector or the like.

The primary side circuit section 10 is connected to the alternating current power supply 2 via a line filter 11, and is configured to include: a bridge circuit 12 and a smoothing capacitor 14 for full-wave rectifying and smoothing an alternating current from the alternating current power supply 2; a power switch element 16 provided by using an FET (Field Effect Transistor) or a bipolar transistor; a switching control section 13 for controlling the power switch element 16; and a startup resistor 15 connected thereto.

The smoothing capacitor 14 is connected in parallel to the bridge circuit 12, and one end of the smoothing capacitor 14 is connected to the startup resistor 15 and an "a" terminal (positive terminal) of a primary coil (primary side winding) 61 of the transformer 6. The other end of the startup resistor 15 is connected to the switching control section 13. The transformer 6 includes: the primary coil 61 whose one end is connected to the power switch element 16; a secondary coil (secondary side winding) 62 consisting of a first winding 621 and a second winding 622; and a feedback coil 63 connected to the switching control section 13.

A "b" terminal (negative terminal) of the primary coil 61 is connected to the drain of the power switch element 16. The power switch element 16 is connected at its source to the bridge circuit 12, and connected at its gate to the switching control section 13, and the drain-source is turned ON/OFF in accordance with a gate control signal from the switching control section 13. An "f" terminal (negative terminal) of the feedback coil 63 of the transformer 6 is connected to the source of the power switch element 16, the bridge circuit 12 and the switching control section 13, while an "e" terminal (positive terminal) of the feedback coil 63 is also connected to the switching control section 13. The switching control section 13 is also connected to the photocoupler 5 for transmitting a control signal from the secondary side circuit section 20.

Next, how the primary side circuit section 10 is operated will be described. An unshown switch for the entire system is inserted in series into a connection line of the alternating current power supply 2 and the line filter 11, for example. When this system switch is in an OFF state, the power from the alternating current power supply 2 is not supplied to the discharge lamp lighting device 1. Therefore, the switching control section 13 is not operated, and the power switch element 16 is in an OFF state since a gate voltage Vgs thereof is 0 V. When the system switch is turned ON and power is supplied from the alternating current power supply 2, the alternating current voltage therefrom is rectified and smoothed by the bridge circuit 12 and the smoothing capacitor 14. Thereafter, the voltage of a line 151 is increased, the power is supplied via the startup resistor 15 to the switching control section 13 to start the operation thereof, and the gate voltage will be also applied to the power switch element 16. When the gate voltage Vgs of the power switch element 16 becomes equal to or higher than a predetermined voltage, the power switch element 16 is turned ON.

When the power switch element 16 is turned ON, a current flows through the primary coil 61 due to the inductance of the primary coil 61 and the voltage applied to both ends "a" and "b" thereof. In the secondary coil 62 and the feedback coil 63, a voltage is generated in accordance with the turns ratios thereof. It should be noted that the "a" terminal of the primary coil 61, the "e" terminal of the feedback coil 63, the "d" terminal of the first winding 621 of the secondary coil 62, and the "c" terminal of the second winding 622 of the secondary coil 62 have the same polarity (serve as positive terminals), so that the voltages generated thereat have the same polarity. The positive terminal ("e" terminal) of the feedback coil 63 is connected to the gate of the power switch element 16 via the switching control section 13. That is, when the power switch element 16 is ON, it is connected to the side of the feedback coil 63, the polarity of which maintains the ON state.

Subsequently, an operation in which the switch is changed from OFF to ON will be described. At the instant when the power switch element 16 is turned OFF, a positive voltage is generated at the "c" terminal and "g" terminal of the secondary coil 62. Then, the power accumulated in the transformer 6 while the power switch element 16 is ON is outputted via a rectifier diode 22 and a rectifier diode 72 of the secondary side circuit section 20. When the power accumulated in the transformer 6 during the ON period has become zero, the residual power causes a positive voltage to be generated at the "e" terminal of the feedback coil 63, and as a result, the switch is turned ON again. The switching control section 13 repeatedly carries out the above-described ON/OFF control. As described above, in the configuration including the smoothing capacitor 14, the transformer 6, the power switch element 16, the rectifier diode 22, the rectifier diode 72, the capacitor 23, and the capacitor 73 (see FIG. 14), power is accumulated in the transformer 6 during the ON period of the power switch element 16, and an operation of taking out the power to the secondary side is performed during the OFF period. By controlling the ON/OFF periods, an operation in which the output voltage is increased or decreased with respect to the input voltage is performed.

Next, a configuration of the secondary side circuit section 20 will be described with reference to FIG. 14. The secondary coil 62 is formed by the first winding 621 and the second winding 622 which have one terminal ("c" terminal) of the windings in common, and the turns ratio between the first winding 621 and the second winding 622 is 13:12, for example. The other terminal ("d" terminal) of the first winding 621 is grounded, while one terminal ("c" terminal) of the first winding 621, i.e., the other terminal ("c" terminal) of the second winding 622, is connected to the anode of the rectifier diode 22.

Further, one end ("g" terminal) of the second winding 622 is connected to the anode of the rectifier diode 72. The cathode of the rectifier diode 72, connected in series to the lamp 4, is connected with the capacitor 73 that is connected in parallel to the lamp 4. Furthermore, the cathode of the rectifier diode 72 and the capacitor 73 are connected with a switch 74.

The switch 74 is connected at its one side to the anode of a diode 75, and is connected at its other side to a resistor 33 of the igniter 3. The igniter 3 includes: a SIDAC (registered trademark) 31, the ON/OFF control of which is switched by an applied voltage; a pulse transformer 32 to which one side of the SIDAC 31 is connected; the resistor 33 and a capacitor 34, by which the oscillation frequency of the SIDAC 31 is determined; and a diode 30, which is connected in series to the lamp 4, for inhibiting a high voltage, generated by the pulse transformer 32, from returning to the converter side. The cathode of the diode 75 is connected to a terminal 4 of terminals 3-4 of the pulse transformer 32.

Similarly to the cathode of the diode 75, the cathode of the diode 30 is also connected to the terminal 4 of the terminals 3-4 of the pulse transformer 32. On the other hand, one end of the SIDAC 31 is connected to a terminal 2 of terminals 1-2 of the pulse transformer 32, and the other end thereof is connected between the resistor 33 and the capacitor 34 connected in series. One end of the first winding 621 (the "c" terminal thereof, or the other terminal of the second winding 622) is connected to the anode of the rectifier diode 22. The cathode of the rectifier diode 22, connected in series to the lamp 4, is connected to the capacitor 23, which is connected in parallel to the lamp 4, and the anode of the diode 30. A voltage supplied via the rectifier diode 22 is smoothed by the secondary side capacitor 23, and then the smoothed voltage is applied to the lamp 4. It should be noted that the "d" terminal of the secondary coil 62 is grounded. The diode 30 is an output of a main converter 70 (main circuit), while the diode 75 is an output of an auxiliary converter 71 (auxiliary circuit). The cathodes thereof are connected to each other, and are connected to the lamp 4 via the terminals 3-4 which are the secondary side of the pulse transformer 32. The igniter 3 is operated only when the lamp 4 is started up, and thereafter functions as a choke coil. Since a voltage as high as several kV is generated during the operation of the igniter 3, this voltage has to be inhibited from being transmitted to the other circuit (s); however, the diode 30 and the diode 75 meet rated specifications for withstanding the high voltage. In other words, the diode 30 and the diode 75 not only function to inhibit high voltage at the startup, but also function to switch the output of the main converter 70 and the auxiliary converter 71.

A first voltage divider resistor 24 and a second voltage divider resistor 25 are connected in parallel to the lamp 4, and the detected lamp voltage is outputted to a control section 21. Further, a current detection resistor 26 is connected in series to the lamp 4, and the detected lamp current is outputted to the control section 21. The igniter 3 applies a voltage as high as several kV to a dozen or so kV to the lamp 4, thus starting up the lamp 4. After arc discharge has been maintained and the lamp 4 has been changed to a steady state, the constant power control of the lamp 4 is carried out by a detection circuit section 22E of the control section 21 and the switching control section 13. A constant voltage control section 23V controls the power switch element 16 via the photocoupler 5 and the switching control section 13 so that the voltage of both ends of the capacitor 23 will not be equal to or higher than a predetermined value when the lamp 4 is extinguished. The constant current control section 24A controls the power switch element 16 via the photocoupler 5 and the switching control section 13 so that a current equal to or higher than a predetermined value will not flow through the lamp 4 when the lamp 4 is lit.

Operations carried out from the start of lighting of the lamp 4 to glow discharge will be described. When the unshown switch for the entire system is OFF, no current flows to any of the diode 30 and the diode 75. When the switch of the system is turned ON, the power switch element 16 performs the switching operation as mentioned above, thereby transmitting power to the secondary side circuit section 20, and increasing the voltages of the capacitor 23 and the capacitor 73. When the turns ratio between the first winding 621 and the second winding 622 is 13:12, and the voltage of the capacitor 23 during no-load period is detected by the first voltage divider resistor 24 and the second voltage divider resistor 25 and controlled by the constant voltage control section 23V so as to be 130 V, the voltage of the capacitor 23 becomes 130 V while the voltage of the capacitor 73 becomes 250 V. The switch 74 is in the ON state, and the voltage of the capacitor 73 is 250 V; thus, the capacitor 34 is, first, charged via the switch 74 and the resistor 33. The charging time τ (time constant) is determined by τ=R×C. It should be noted that R represents a resistance value of the resistor 33, and C represents a capacitance of the capacitor 34.

The ON-state voltage of the SIDAC 31 is 220 V, and when the voltage of the capacitor 34 has reached 220 V, the SIDAC 31 is brought into conduction, thus applying a voltage of 220 V to the terminals 1-2 of the pulse transformer 32. The ratio between the winding between the terminals 1-2 and the winding between the terminals 3-4 of the pulse transformer 32 is 1:25, and a voltage of 5 kV is generated between the terminals 3-4, thus starting the operation of the lamp 4. In this case, since the voltage of the capacitor 73 is higher than that of the capacitor 23, the diode 75 is turned ON while the diode 30 is turned OFF, and a current is supplied to the lamp 4 mainly via the diode 75. In other words, power supply is carried out through the rectifier diode 72, the capacitor 73 and the diode 75. After breakdown, the lamp 4 is changed to glow discharge, and a voltage of 100 V to 200 V and a power of about 50 W are supplied via the diode 75. Subsequent to the lighting of the lamp 4, except when extinction occurs, the capacitor 34 will not be charged with a voltage of 220 V, which is required to turn ON the SIDAC 31, and therefore, the igniter 3 stops the high voltage generating operation.

The switch 74 includes an FET or the like, for example, and is switched from ON to OFF after a lapse of a predetermined period of time since the main switch has been turned ON, e.g., after a lapse of 6 seconds in consideration of extinction or hot restart (relighting from a state in which the lamp 4 is hot) resulting from transient instability at the startup of the lamp 4, for example. It should be noted that, in FIG. 14, the switch 74 is located at a position that separates the resistor 33 and the diode 75 from the capacitor 73, but may alternatively be configured to separate only the diode 75 from the capacitor 73. In that case, the resistor 33 is always supplied with a current from the capacitor 73; however, the voltage of both ends of the capacitor 73 during the lighting of the lamp is determined by the lamp voltage VL and the turns ratio between the first winding 621 and the second winding 622, and since this voltage is equal to or lower than 220 V, the SIDAC 31 is not operated. Hence, the current flowing through the resistor 33 stops flowing therethrough at the point in time when the capacitor 34 is charged, and therefore, the switch 74 does not have to break the connection between the resistor 33 and the capacitor 73. Further, in order to separate the diode 75 from the capacitor 73, a switch may be inserted at the anode side of the switch 74, or may be inserted at the cathode side thereof. The path through which a current flows may be cut off by separating the diode 75 from the diode 30 and/or the terminal 4 of the pulse transformer 32. Furthermore, in addition to switching of the switch 74 from ON to OFF after a lapse of a predetermined period of time, it may be switched from ON to OFF by detecting variations in the lamp current and the lamp voltage. In that case, information of the lamp current or the lamp voltage, which is to be inputted to the control section 21, is also inputted to the switch 74.

The switch 74 has an after-mentioned CPU 741, which determines whether the lamp voltage VL (the voltage of the capacitor 23) is 100 V or less, and determines that glow discharge is finished and the lamp is changed to arc discharge when the lamp voltage VL has become 100 V or less, thereby turning OFF the switch 74. Thus, the power supply through the diode 75 is stopped. At this point in time, the lamp voltage VL is 100 V or less, and the power supply by the main converter 70 through the rectifier diode 22, the capacitor 23 and the diode 30 is started. Furthermore, when the determination is made using the lamp current AL, the CPU 741 determines whether the lamp current AL is 1 A or more, and turns OFF the switch 74 when the lamp current AL has become 1 A or more. Thus, the power supply by the main converter 70 through the rectifier diode 22, the capacitor 23 and the diode 30 is started, and the power supply through the diode 75 is stopped.

Figure 15:
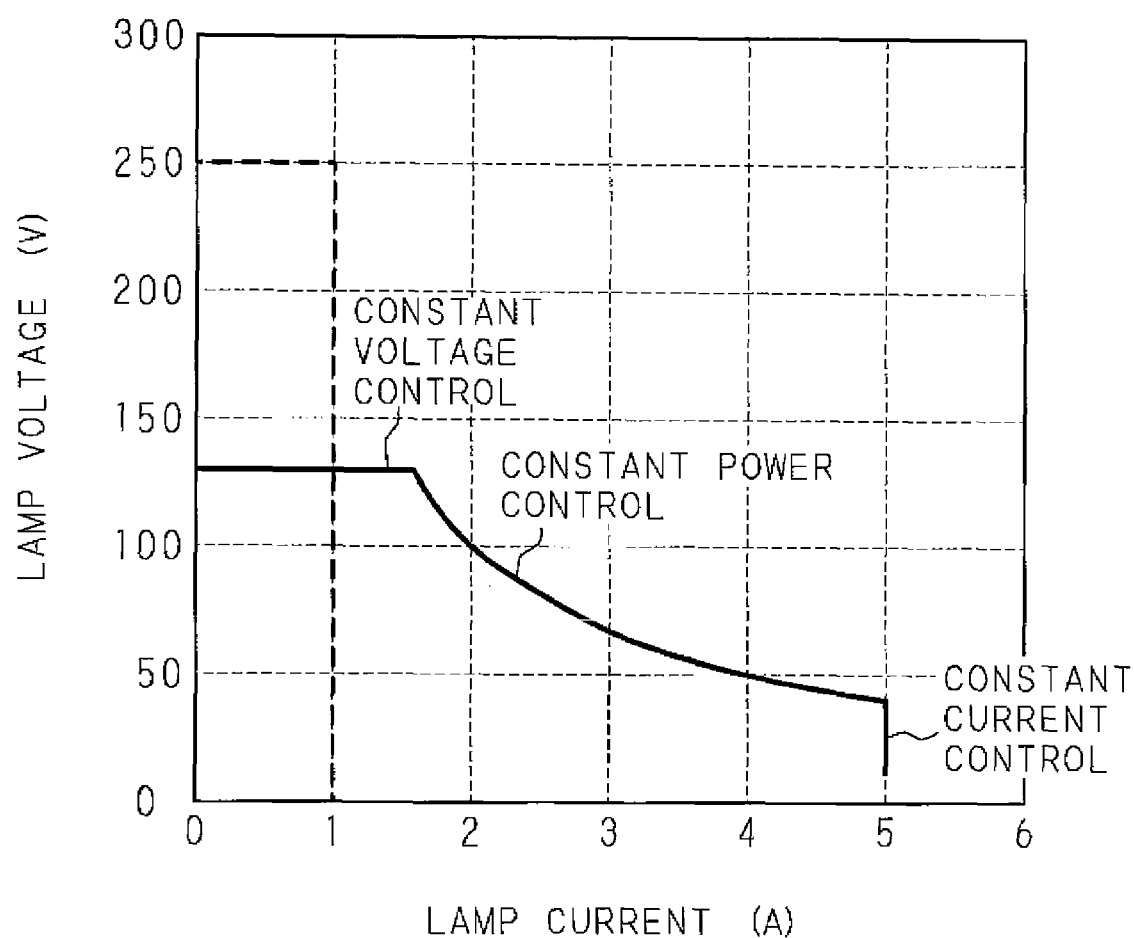
FIG. 15 A graph showing output characteristics of the discharge lamp lighting device.

FIG. 15 is a graph showing output characteristics of the discharge lamp lighting device 1. The vertical axis represents the lamp voltage of the lamp 4, which is expressed in the unit [V (volt)], while the horizontal axis represents the lamp current of the lamp 4, which is expressed in the unit [A (ampere)]. The transformer 6, the power switch element 16, the smoothing capacitor 14, the rectifier diode 22, and the capacitor 23 constitute the main converter 70. The main converter 70 is a self-excited flyback converter (RCC: Ringing Choke Converter). The characteristics indicated by the solid line in FIG. 15 represent the characteristics of this main converter 70. On the other hand, the transformer 6, the power switch element 16, the smoothing capacitor 14, the rectifier diode 72, and the capacitor 73 constitute the auxiliary converter 71. The auxiliary converter 71 is also a self-excited flyback converter. In the graph of FIG. 15, the solid line represents the characteristics of the current/voltage supplied from the main converter 70. In the characteristics indicated by the solid line, the characteristic, in which the lamp current is 1.6 A or less and the lamp voltage is kept constant at 130 V, represents the characteristic of the constant voltage control section 23V. The characteristic, in which the lamp voltage is 40 V or less and the lamp current is kept constant at 5 A, represents the characteristic of the constant current control section 24A. The hyperbola represents the constant power characteristic of the detection circuit section 22E. The dotted line represents the characteristics of current/voltage supplied from the auxiliary converter 71. The open-circuit voltage (the voltage when the output current is zero), or the voltage during light-load period when the output current is low is 250 V, which is the voltage controlled by the first voltage divider resistor 24 and the second voltage divider resistor 25, and is determined by the ratio between the first winding 621 and the second winding 622. The current drooping characteristic at 1 A results from the control performed by the current detection resistor 26.

The present embodiment is based on the assumption that the rated power of the lamp 4 is 200 W, and the lamp voltage VL becomes 120 V at the maximum at the end of the life span of the lamp 4. Further, the open-circuit voltage generated in the capacitor 23 is 130 V so as to enable the driving at 120 V, and the open-circuit voltage of the carrier 73 is 250 V. After the startup of the lamp 4, the auxiliary converter 71 allows the igniter 3 to be operated to cause breakdown in the lamp 4, and thereafter allows the lamp 4 to be changed to glow discharge.

The main converter 70 and the auxiliary converter 71 have the primary side circuit section 10 in common, and individually have the rectifier diode 22 or the like and the capacitor 23 or the like of the secondary side circuit section 20. The converters also have the transformer 6 in common, and individually have the secondary coil 62. The component sizes, withstand voltage specifications and maximum current specifications to be used for the converters, each converting a voltage, a current or a power to a desired value, are determined by the input voltage range, output voltage range, output current range and the like in general. The wider the above-mentioned input/output ranges, the higher the necessary withstand voltage and maximum current ratings in general, resulting in a tendency to increase the cost of components and the outer dimensions.

Due to the increase in the withstand voltage, there also occurs a trade-off relationship in which the parasitic capacitance is increased and the switching speed specifications are degraded. By reducing the output voltage of the main converter 70 from 250 V to 130 V, such increase in ratings or sizes of components is avoided. As shown in FIG. 14, the control section 21 carries out control by detecting the voltage of both ends of the capacitor 23 using the first voltage divider resistor 24 and a second voltage divider resistor 25. In other words, the auxiliary converter 71 is equivalent to being non-controllable with respect to its output voltage. However, in this embodiment, the auxiliary converter 71 outputs a voltage of 250 V necessary for breakdown, a current of 0.5 A at 100 V to 200 V necessary for glow discharge, or a power of about 50 W necessary for the change from glow discharge to arc discharge. These operations are finished in several seconds during the lighting. Hence, due to the control of the main converter 70, the voltage, determined by the turns ratio between the first winding 621 and the second winding 622 is taken out to the output of the auxiliary converter 71 and is supplied to the lamp 4, thus completing the initial lighting of the lamp 4. The size reduction of the main converter 70 can be achieved by supplying the necessary voltage and power in a short period of time during the lighting of the lamp 4 using the auxiliary converter 71 that is simply configured and easily controlled. Since the auxiliary converter 71 may be non-controllable, the photocoupler 5 or the switching control section 13 can be shared with the main converter 70.

Furthermore, in the case of operating the auxiliary converter 71 for 6 seconds from the start of lighting as described later, a constant current output of about 1 A at 15 V may be outputted from the auxiliary converter 71, and this control may be carried out in the constant current control section 24A by performing detection in the current detection resistor 26. During the ON period of the switch 74, the diode 75 is ON and the high voltage diode 30 is OFF; therefore, the control in the constant current control section 24A is enabled. Also during the glow discharge period, the power switch element 16 carries out ON/OFF operations, and although the auxiliary converter 71 does not have its output voltage directly controlled, it is outputted to the lamp 4 upon reception of power supply from the primary side circuit section 10 during the ON period of the switch 74. As compared with a method of providing a large-capacitance electrolytic capacitor in the secondary side circuit section 20 and taking out the power necessary for glow discharge with electric charges charged into this capacitor, the size reduction is more easily achieved.

Figure 16:
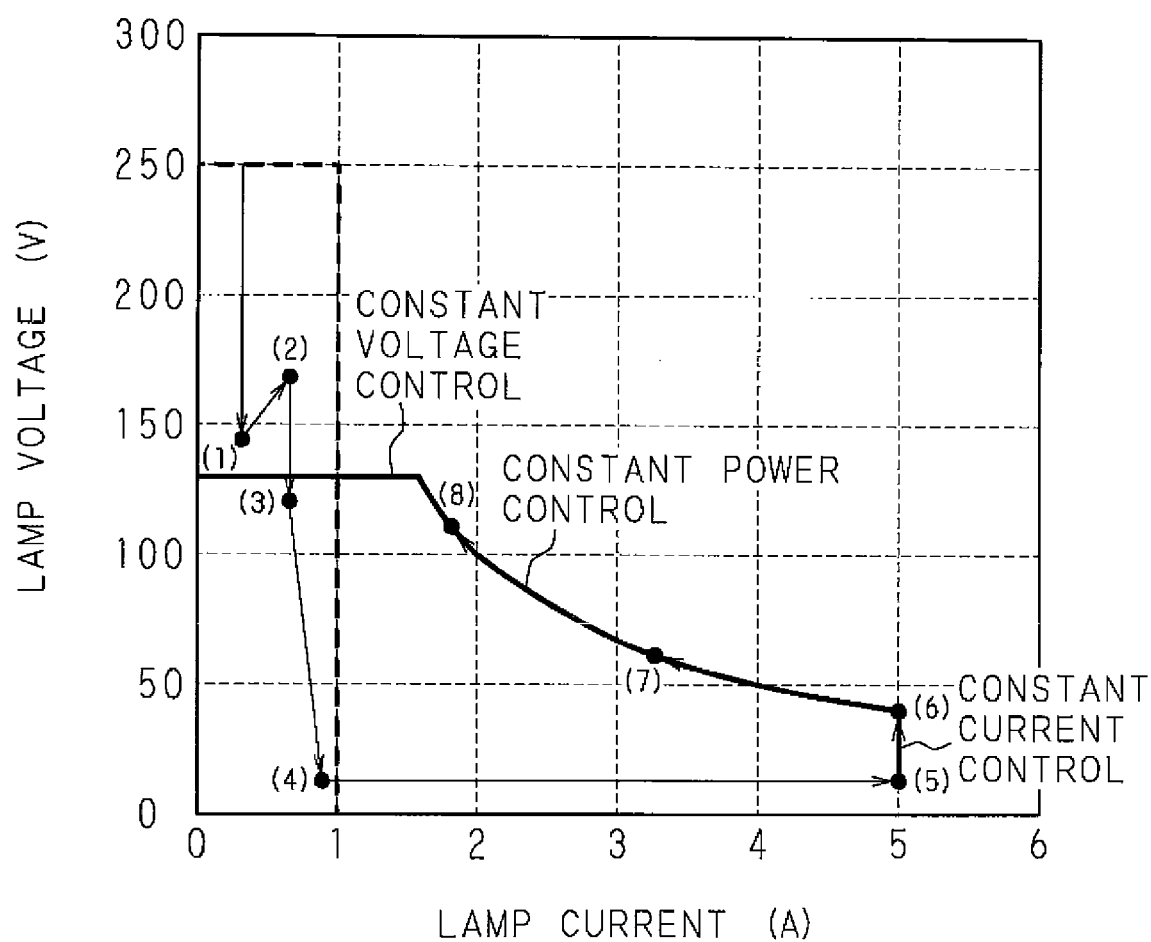
FIG. 16 A graph in which the operating points of the lamp are schematically superposed on the graph of FIG. 15.

FIG. 16 is a graph in which the operating points of the lamp 4 are schematically superposed on the graph of FIG. 15. The points indicated by the arrows and (1) to (8) represent the operating points of the lamp 4 in chronological order. Before the lamp 4 is lit (i.e., before the discharge lamp lighting device 1 is operated), the current is 0 (zero) A, and the voltage is 0 (zero) V, which is determined by the output state of the RCC converter. When the discharge lamp lighting device 1 has started its operation, the auxiliary converter 71 is operated, and a voltage of 250 V is generated at both ends of the capacitor 73. Upon reception of this voltage, the igniter 3 is operated. Then, for the lamp 4, a voltage as high as several kV to several tens of kV is generated, and is applied to the lamp 4. In the lamp 4, breakdown occurs due to the high voltage, and a current starts to flow therethrough.

In the initial lighting state, the lamp 4 is lit in a mode called "glow discharge". As shown in FIG. 16, the lamp voltage during this time is about 100 V to about 200 V, and the lamp current is about 0.5 A. When the lamp 4 is supplied with sufficient power, it is changed from glow discharge to initial arc discharge. In this manner, the power necessary for the glow discharge in (1) to (3) and the initial arc discharge in (4) is supplied by the auxiliary converter 71. During this time, the characteristic of the lamp 4 enters a state called "negative resistance", in which a current flows unlimitedly. In this case, the constant current control in which the upper limit current is 1 A as described above is carried out by the constant current control section 24A, or another constant current control section that is not shown.

When the current limitation of the output of the auxiliary converter 71 and output of the main converter 70 is carried out by the constant current control section 24A, a circuit for limiting a first upper limit current (which is 1 A in the present example) for the auxiliary converter 71, and a circuit for limiting a second upper limit current (which is 5 A in the present example) for the main converter 70 may be provided so that switchover from the circuit for limiting the first upper limit current to the circuit for limiting the second upper limit current is performed after a lapse of a predetermined period of time since the start of lighting. Alternatively, independently from the constant current control section 24A, a circuit for limiting a first upper limit current (which is 1 A in the present example) for the auxiliary converter 71 may be provided. It should be noted that the first upper limit current is 1 A in the present embodiment; however, the present embodiment is not limited to this, and the first upper limit current may be 2 A, for example. Depending on the type of the lamp 4, the current allowed to flow for several seconds from the startup is limited; thus, the avoidance of blackening of the lamp and an increase in longevity thereof may be achieved, and under such conditions, the above-described switchover from an initial current of 1 A to a subsequent current of 5 A is effective.

After 6 seconds from the start of lighting of the lamp 4, the switch 74 is turned OFF, and the power supply is switched from the auxiliary converter 71 to the main converter 70, so that the state of the lamp 4 is changed from (4) to (5). In the course of the initial arc is lighting, the lamp 4 generates heat, and the lamp voltage is increased ((5) to (7)). The discharge lamp lighting device 1 detects this lamp voltage variation, and the control is changed from the constant current control to the constant power control performed by the detection circuit section 22E. In the constant power control, the flowing current is decreased in accordance with the increase in the lamp voltage, and the lamp 4 is stably lit at the steady lighting stage (7) where it is in a thermally balanced state. At the end of the life span, for example, the lamp voltage is increased to 120 V as indicated by (8), but the control for reducing the current and keeping the power constant is carried out by the detection circuit section 22E.

Figure 17:
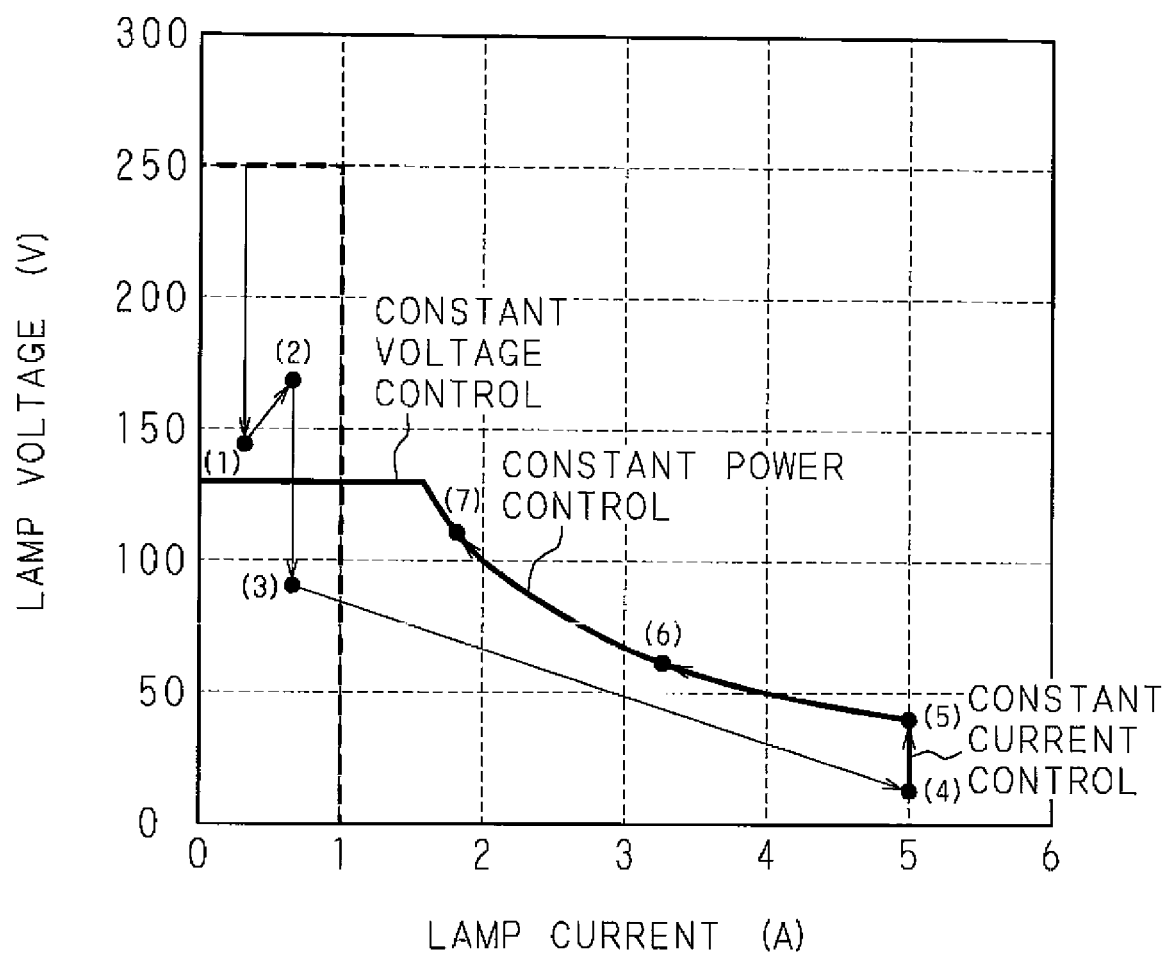
FIG. 17 A graph in which the operating points of the lamp are schematically superposed on the graph of FIG. 15, in the case where a lamp voltage VL is monitored.

FIG. 17 is a graph in which the operating points of the lamp 4 are schematically superposed on the graph of FIG. 15, in the case where the lamp voltage VL is monitored to appropriately perform the switching control of the switch 74. In FIG. 16, there is shown a transition when the switch 74 is turned OFF after a lapse of a predetermined period of time from the start of lighting of the lamp 4; however, FIG. 17 is a graph showing a case where the switch 74 is turned OFF to switch the power supply from the auxiliary converter 71 to the main converter 70 when the lamp voltage has become 100 V or less. The voltage is gradually reduced after the start of glow discharge, and the lamp is changed from (1) to (3). At the stage (3), since the lamp voltage VL becomes 100 V or less, the switch 74 is turned OFF, and power supply is carried out by the main converter 70. In this case, the lamp 4 is changed to (4) in which the constant current control is carried out by the constant current control section 24A. In this case, as compared with the case where the switch 74 is turned OFF after a lapse of a predetermined period of time, a current limiting section for the auxiliary converter 71 is unnecessary, thus reducing the circuit size. Further, since the maximum output current of the auxiliary converter 71 is suppressed to about 0.5 A, the current ratings of the components can be reduced. Furthermore, a period of time required for the lamp voltage to become 100 V or less from the startup of the lamp 4 is as short as several tens of milliseconds, for example, and the heat dissipation design for a loss cause by the circuit can be easily carried out as compared with the case where the above-described continuous operation for 6 seconds. Depending on the type of the lamp 4, large power may be supplied at the startup to rapidly change the lamp to a steady lighting state, thus achieving an increase in longevity. For such a lamp 4, a current as large as 5 A is immediately supplied after the end of glow discharge, thereby making it possible to achieve an increase in longevity.

Moreover, for the reduction of rush current at the startup and/or stable lighting control of the lamp 4 at the startup, a method of switching the capacitors by a switch such as an FET is generally employed so as to reduce the capacitance of the smoothing capacitor located at the output of the converter at the startup; however, in the present embodiment, for example, if the capacitance of the capacitor 73 of the auxiliary converter 71 is 0.1 µF (microfarad) and that of the capacitor 23 of the main converter 70 is 2 µF, the switch 74 can be used as a substitute for the FET for switching the capacitors. In other words, the capacitance of the capacitor 73 may be determined in accordance with the convenience of the activation of the lamp 4.

Thereafter, the lamp voltage is increased ((4) to (6)). The discharge lamp lighting device 1 detects this lamp voltage variation, and the control is changed from the constant current control to the constant power control performed by the detection circuit section 22E. In the constant power control, the flowing current is decreased in accordance with the increase in the lamp voltage, and at the rated stage (6), stable rated lighting is provided. At the end of the life span, for example, the lamp voltage is increased to 120 V as indicated by (7), but the control for reducing the current is carried out by the detection circuit section 22E.

Figure 18:
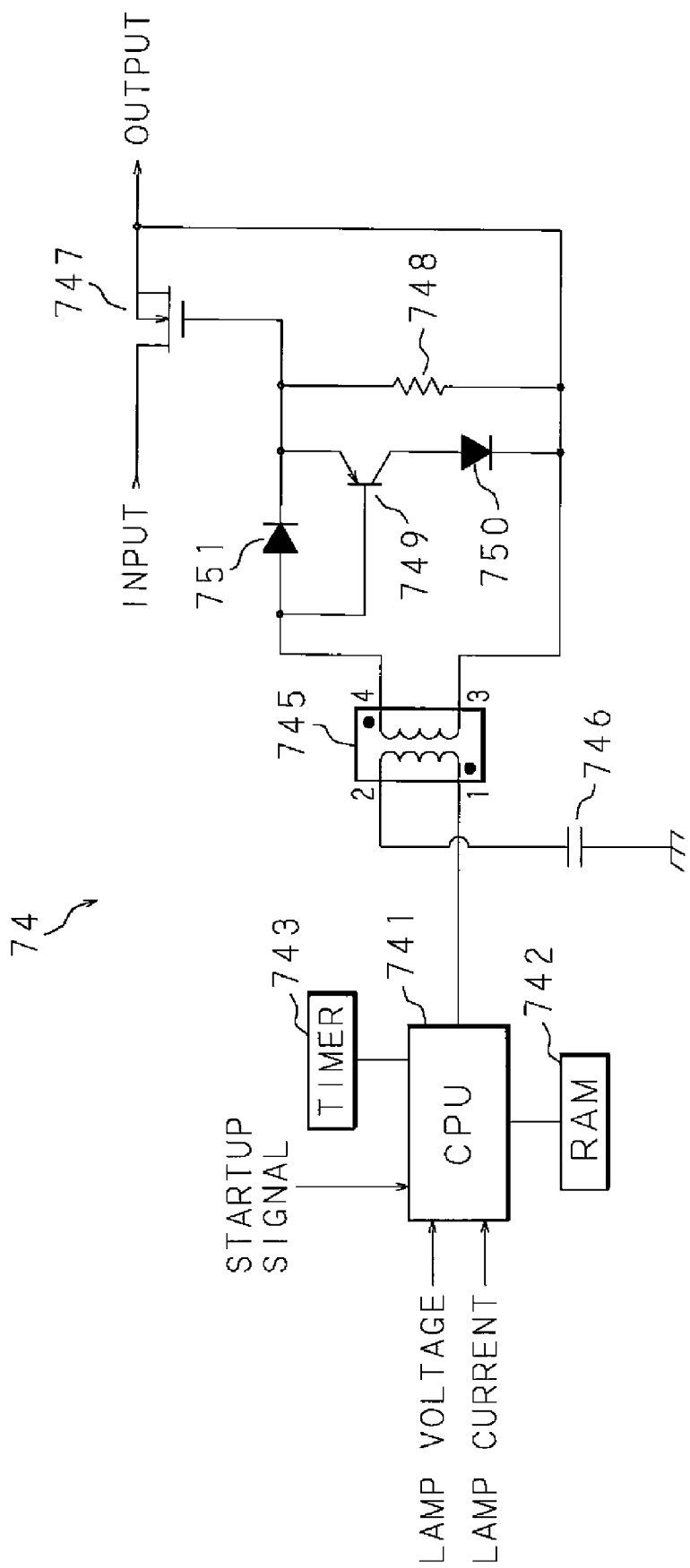
FIG. 18 A circuit diagram showing a circuit configuration of a switch.

Furthermore, the ON/OFF of the switch 74 may be provided in an embodiment in which the control performed using a timer is combined with the control performed by monitoring the lamp voltage or lamp current. FIG. 18 is a circuit diagram showing a circuit configuration of the switch 74. The switch 74 is configured to include: an FET 747; a resistor 748; a diode 751; a transistor 749; a diode 750; an isolation transformer 745; a capacitor 746; a CPU (Central Processing Unit) 741; a timer 743; and an RAM (Random Access Memory) 742.

The CPU 741 is connected to: the timer 743 for outputting time information; the RAM 742 for storing various computation results and a programs for executing the ON/OFF control of the FET 747; and a terminal 1 of the isolation transformer 745. The CPU 741 is fed: a startup signal indicative of the startup of the lamp 4 associated with the startup of the entire system; and information of the lamp current and lamp voltage of the lamp 4. Based on the startup signal, the time information from the timer 743, and the lamp voltage or lamp current, and in accordance with the program stored in the RAM 742, the CPU 741 outputs a high signal or a low signal to the primary side terminal 1 of the isolation transformer 745.

A primary side terminal 2 of the isolation transformer 745 is connected to the ground via the capacitor 746. A secondary side terminal 4 of the isolation transformer 745 is connected to the anode side of the diode 751 and the base of the pnp type transistor 749. On the other hand, a secondary side terminal 3 of the isolation transformer 745 is connected to: the cathode of the diode 750, which is connected at its anode side to the collector of the transistor 749; one end of the resistor 748; and the source of the FET.

The FET 747 is turned ON when a high signal is outputted from the CPU 741, and is turned OFF when a low signal is outputted therefrom. The gate of the FET 747 is connected to the other end of the resistor 748, the cathode of the diode 751, and the collector of the transistor 749.

Next, how the switch 74 is operated will be described. When the terminal 1 of the isolation transformer 745 is fed a high signal, a positive potential is generated at the terminal 4 with respect to the terminal 3. Thus, the diode 751 is brought into conduction, and the transistor 749 is turned OFF. The FET 747 is turned ON upon application of a positive potential to its gate with respect to its source. Thus, the drain-source is brought into conduction, and a current flows in the direction from the input to the output. On the other hand, when the terminal 1 of the isolation transformer 745 is fed a low signal, the terminal 4 becomes negative with respect to the terminal 3. In this case, the transistor 749 is turned ON upon application of a bias voltage to the emitter-base thereof. Further, the diode 751 is turned OFF due to the application of the reverse voltage thereto. Thus, electric charges charged into the capacitance present at the gate of the FET 747 are extracted via the transistor 749 and the diode 750, thereby turning OFF the FET 747. The isolation transformer 745 shifts the level of an output of 5 V of the CPU 741 to a higher voltage.

Figure 19A:
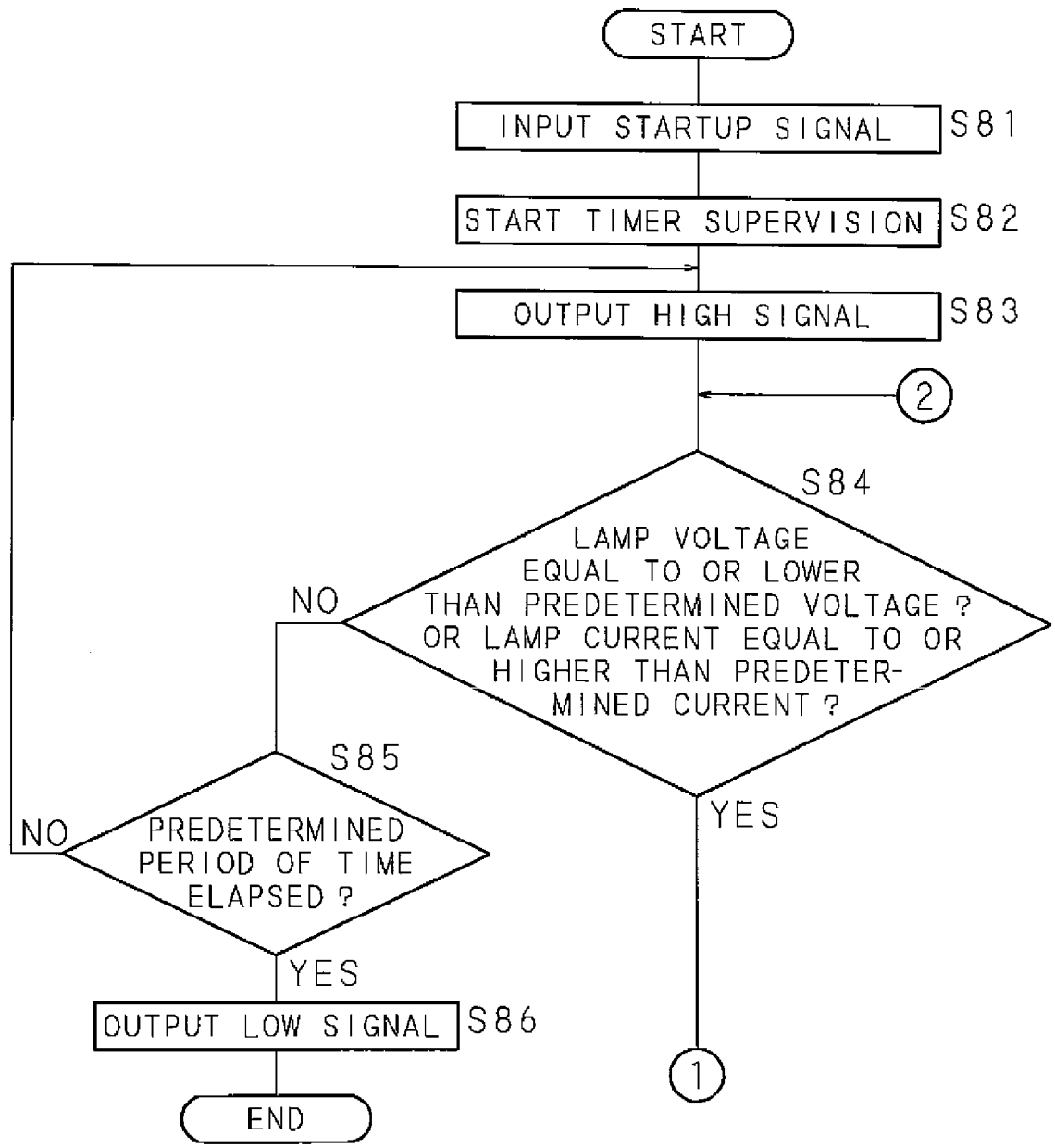
FIG. 19 A flow chart showing the procedure of a control process performed by a CPU.
Figure 19B:
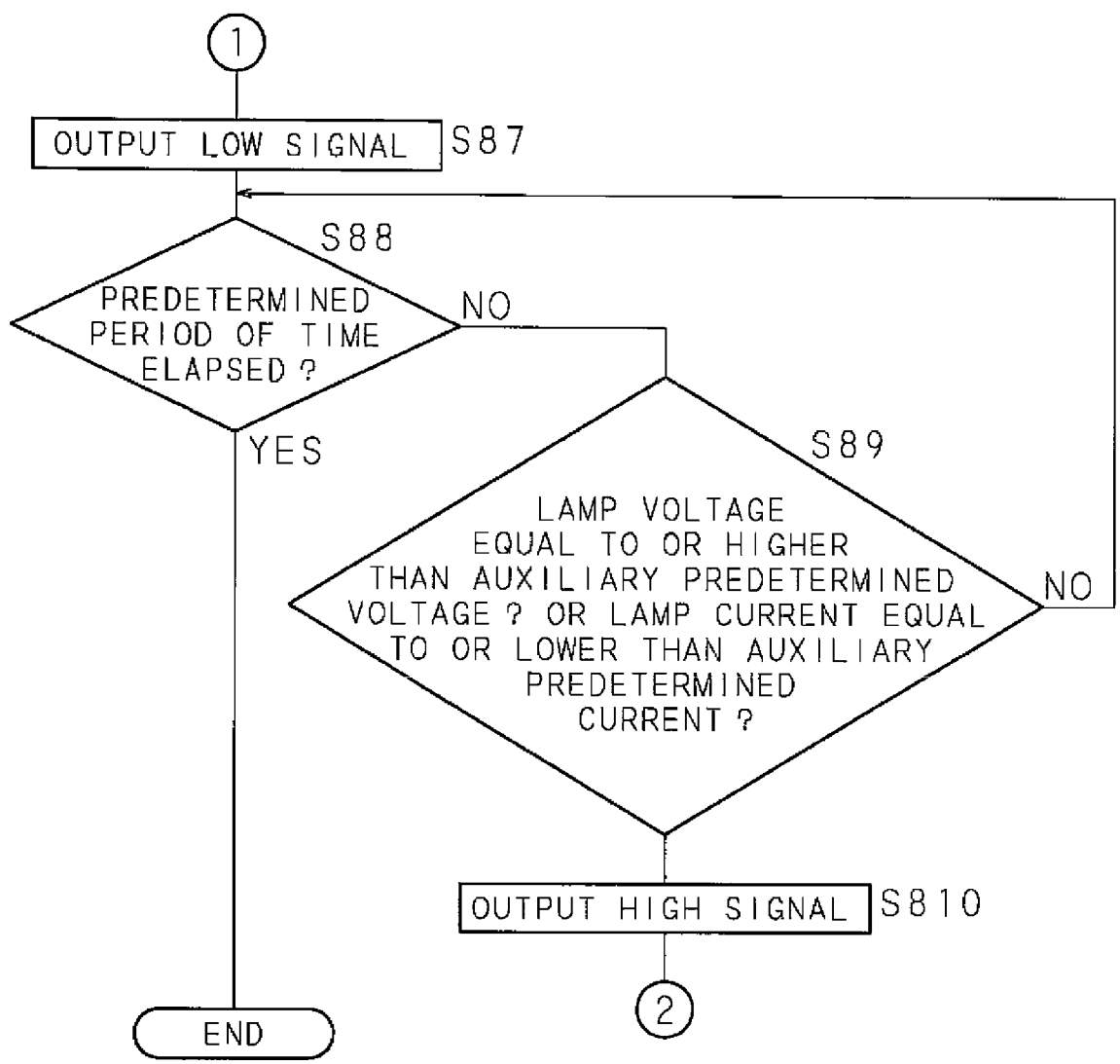
Figure 21:
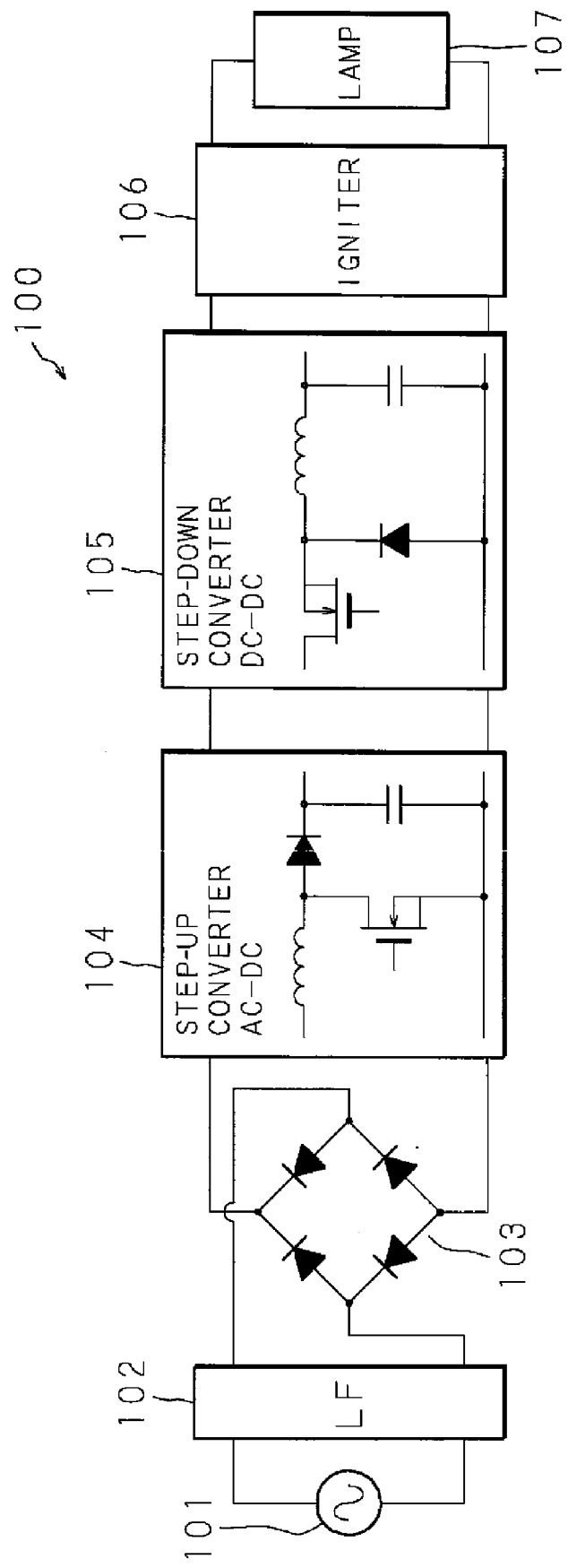
FIG. 21 A circuit diagram showing a configuration of a conventional discharge lamp lighting device.
Figure 22:
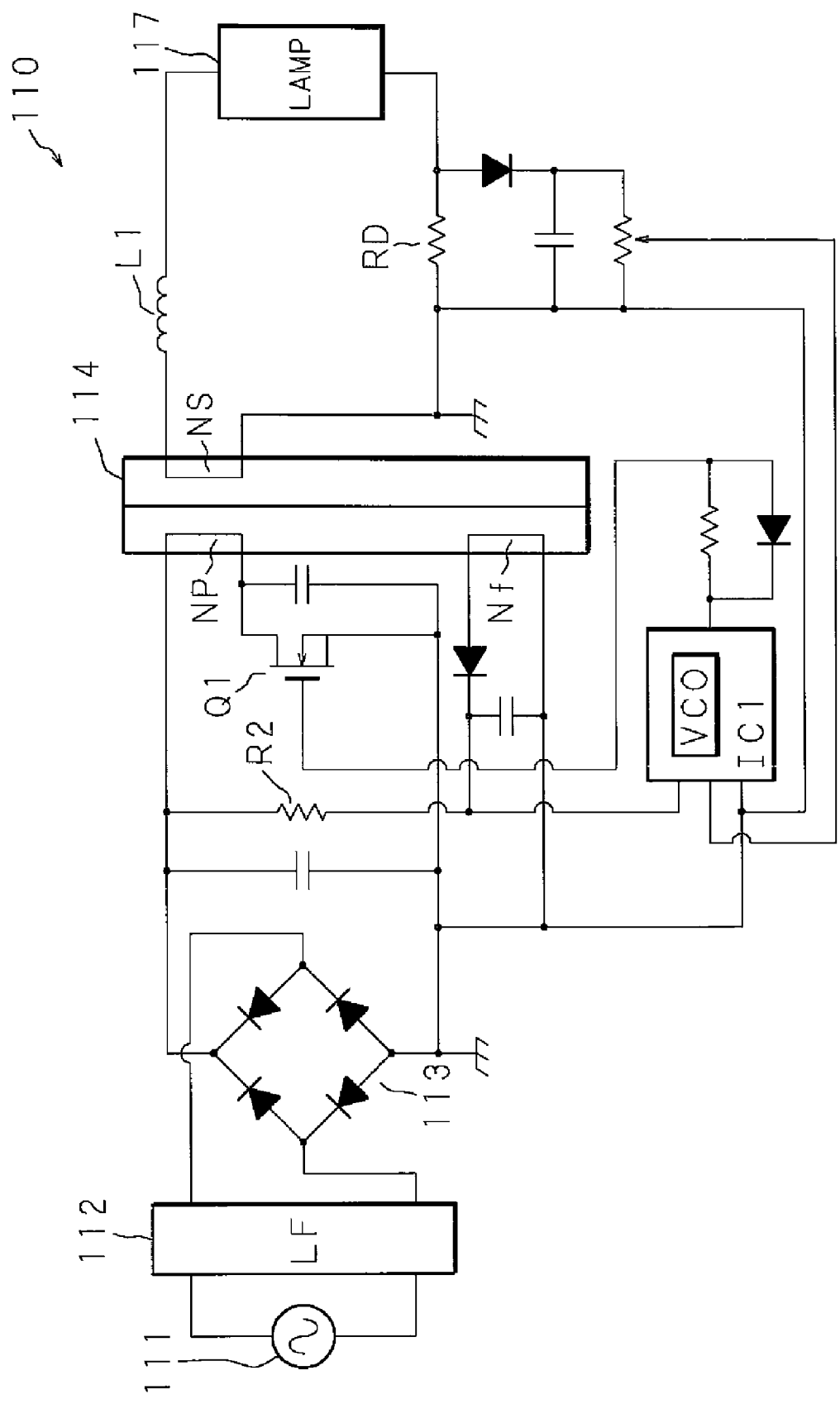
FIG. 22 A conventional high-intensity discharge lamp lighting device for lighting a lamp driven by an alternating current.

FIG. 19 (FIGS. 19A and B) is a flow chart showing the procedure of a control process performed by the CPU 741. An unshown switch for the entire system is manipulated, and a startup signal indicative of the startup of the lamp 4 is inputted to the CPU 741 (Step S81). The input of the startup signal triggers the CPU 741 to start the timer supervision performed by the timer 743 (Step S82). The time information is outputted from the timer 743 to the CPU 741. Concurrently with this process step, the CPU 741 outputs a high signal to the terminal 1 of the isolation transformer 745 (Step S83). Thus, the switch 74 is turned ON, thereby carrying out the power supply by the auxiliary converter 71.

Based on the inputted lamp voltage or lamp current (electrical quantity), the CPU 741 determines whether the inputted lamp voltage is equal to or lower than a predetermined voltage, or the inputted lamp current is equal to or higher than a predetermined current (Step S84). For example, this predetermined voltage is 100 V, or the predetermined current is 1 A, and these pieces of information are stored in the RAM 742. When determined that the inputted lamp voltage is equal to or lower than the predetermined voltage, or the inputted lamp current is equal to or higher than the predetermined current (when the answer is YES in Step S84), the CPU 741 determines that there has occurred a change to arc discharge, and outputs a low signal to the terminal 1 of the isolation transformer 745 (Step S87). Thus, the switch 74 is turned OFF, thereby carrying out the power supply by the main converter 70.

With reference to the time information outputted from the timer 743, the CPU 741 determines whether a predetermined period of time has elapsed (Step S88). It should be noted that this predetermined period of time is stored, for example, as 6 seconds in the RAM 742. When determined that the predetermined period of time has elapsed (when the answer is YES in Step S88), the CPU 741 determines that the lamp 4 is lit properly, thus ending the process. On the other hand, when determined that the predetermined period of time has not elapsed (when the answer is NO in Step s88), the CPU 741 determines, based on the inputted lamp voltage or lamp current, whether the inputted lamp voltage is equal to or higher than an auxiliary predetermined voltage, or the inputted lamp current is equal to or lower than an auxiliary predetermined current (Step S89). These auxiliary predetermined voltage and auxiliary predetermined current are used to detect extinction caused by a special arc after the initial arc. The values of the auxiliary predetermined voltage and auxiliary predetermined current are different from those of the above-mentioned predetermined voltage and predetermined current; for example, the auxiliary predetermined voltage may be 120 V while the auxiliary predetermined current may be 0.1 A, and these pieces of information are stored in the RAM 742.

When determined that the inputted lamp voltage is not equal to or higher than the auxiliary predetermined voltage, or the inputted lamp current is not equal to or lower than the auxiliary predetermined current (when the answer is NO in Step S89), the CPU 741 determines that no extinction has occurred, and goes to Step S88 again. On the other hand, if the lamp 4 is extinguished, the lamp 4 enters an insulated state, in which the lamp current becomes 0 A while the lamp voltage becomes 130 V since it becomes unstable to exert low-voltage control. Hence, when determined that the inputted lamp voltage is equal to or higher than the auxiliary predetermined voltage, or the inputted lamp current is equal to or lower than the auxiliary predetermined current (when the answer is YES in Step S89), the CPU 741 determines that extinction has occurred, and outputs a high signal to the terminal 1 of the isolation transformer 745 (Step S810). Thus, the switch 74 is turned ON again, and power supply is carried out by the auxiliary converter 71. Then, the CPU 741 goes to Step S84, and repeats the above-describe process steps.

In Step S84, when determined that the inputted lamp voltage is not equal to or lower than the predetermined voltage, or the inputted lamp current is not equal to or higher than the predetermined current (when the answer is NO in Step S84), the CPU 741 determines whether the predetermined period of time has elapsed (Step S85). When determined that the predetermined period of time has not elapsed (when the answer is NO in Step S85), the CPU 741 goes to Step S83 so as to continue the monitoring. On the other hand, when determined that the predetermined period of time has elapsed (when the answer is YES in Step S85), the CPU 741 outputs a low signal to the terminal 1 of the pulse transformer 745 (Step S86). Thus, the switch 74 is turned OFF, and power supply is carried out by the main converter 70.

It should be noted that also in the case of a separately excited flyback system, the voltage for the igniter 3 and the power for glow discharge can be efficiently taken out by providing winding dedicated to the secondary side circuit section 20 and taking out the voltage separately. In both the cases of self-excited flyback and separately excited flyback, as compared with a forward type converter, for example, an output-stage coil is unnecessary, and the number of diodes for rectification can be small, thus enabling a simple configuration. In FIG. 14, the first winding 621 (between the "d" and "c" terminals), and the second winding 622 (between the "c" and "g" terminals) have the "c" terminal in common. In this embodiment, for example, the second winding 622 may be provided between the "d" and "g" terminals, and the turns ratio between the first winding 621 and the second winding 622 may be 13:25.

The case of driving the DC type lamp 4 has been described thus far. In the case of driving the AC type lamp 4, an inverter circuit (not shown) may be inserted at a preceding stage of the igniter 3. The inverter circuit normally includes four FET switches. The polarities of the voltages applied to both ends of the lamp 4 are switched. In this case, application of a slight direct current component to the AC type lamp 4 leads to the occurrence of a serious degradation in life span; however, in the present embodiment, since it is unnecessary to carry out power control and/or current control by an inverter circuit, the direct current application can be easily avoided.

A single device, provided by combining the CPU 741 of FIG. 18 with the microcomputer 225 of FIG. 5, may be allowed to carry out processes. In the foregoing description, the examples of the power or voltage necessary for glow discharge, and VL for determining glow discharge and arc discharge are numerically expressed, but the present application is not limited to these numerical values. For example, the rated power of the lamp 4 is widely ranges from 50 W to 300 W. Based on the present embodiment, the device may be adjusted in accordance with the specifications of the lamp 4.

As described above, in the present embodiment, the lamp 4 can be ideally controlled with a simple configuration. By using the flyback converter capable of increasing and decreasing voltage, any type of the lamp 4 (discharge lamp) such as a xenon lamp, a metal halide lamp, or a high-pressure mercury-vapor lamp can be driven and lit. The flyback converter may be self-excited or separately excited. By allowing the transformer 6 of the flyback converter to have sub-winding, the auxiliary converter can be simply configured. A high voltage can be easily taken out by the common control switch, and the size reduction of the main converter 70 in charge of arc discharge can be achieved by taking out the voltage necessary for the igniter 3 and the power necessary for the glow from the auxiliary converter 71. Further, it is unnecessary to add a large capacitor connected in parallel to the lamp 4. The main converter 70 and the auxiliary converter 71 have the two smoothing capacitors (i.e., the capacitor 23 and the capacitor 73); therefore, if the capacitor capacitance of the auxiliary converter 71 is reduced, the lamp 4 is stabilized during the lighting and the frequency of occurrence of extinction is reduced. Furthermore, a rush current can be prevented.

Embodiment 2 is implemented as described above, and the other configurations and operations are similar to those of Embodiment 1; therefore, the corresponding parts are identified by the same reference numerals, and the detailed description thereof will be omitted.

Embodiment 3

The foregoing discharge lamp lighting device 1 is applied to a projector, for example. FIG. 20 is a block diagram showing a hardware configuration of a projector. The projector 300 is configured to include: the discharge lamp lighting device 1 of Embodiment 1; a lamp 4; a reflecting mirror 321; a color wheel 320; an image forming element (hereinafter called a "DMD (Digital Micromirror Device)" (registered trademark)) 360; an image forming element control circuit 370; a projector lens 380; a fan 330; a main control section 390; and an image signal processing section 391.

The main control section 390 controls the above-described respective hardware sections in accordance with a program stored in an unshown memory. An image signal is inputted to the image signal processing section 391. The image signal processing section 391 performs processes, such as synchronizing separation and scaling, on the image signal, and outputs the processed image signal to the image forming element control circuit 370. In the projector 300, a white light emitted from the lamp 4 is concentrated, and is irradiated onto the color wheel 320. The color wheel 320 is formed as a disc in which red, blue and green optical filters are circumferentially arranged, and is configured so as to be rotated at a high speed by an unshown drive motor.

With the rotation of the color wheel 320, filters of respective colors are sequentially inserted into an optical path of light emitted from the lamp 4, and the white light irradiated onto the color wheel 320 is divided, in a time-division manner, into monochromatic lights of respective colors, i.e., a red light, a green light and a blue light. Then, the divided monochromatic lights are sent to the reflecting mirror 321, and are irradiated onto the DMD 360. It should be noted that a liquid crystal panel may be used instead of the DMD. The DMD 360 is driven and controlled by the image forming element control circuit 370. The image forming element control circuit 370 drives the DMD 360 in accordance with the inputted image signal. Specifically, each cell and minute mirror of the DMD 360 are turned ON or OFF in accordance with the inputted image signal, thereby reflecting the irradiated monochromatic lights on a pixel-by-pixel basis to carry out light modulation and form an image light. The formed image light is incident on the projector lens 380, and is enlargedly projected onto an unshown screen or the like by the projector lens 380.

The discharge lamp lighting device 1 controls the lighting and extinguishing of the lamp 4. The fan 330 serves to cool the lamp 4 or the inside of the projector 300, and is driven by an unshown motor. It should be noted that the present embodiment has been described based on the embodiment in which the discharge lamp lighting device 1 is applied to the projector 300; however, the present invention is not limited to this embodiment, but the discharge lamp lighting device 1 may also be applied to general illumination and the like.

Embodiment 3 is implemented as described above, and the other configurations and operations are similar to those of Embodiments 1 and 2; therefore, the corresponding parts are identified by the same reference numerals, and the detailed description thereof will be omitted.

The invention claimed is:

1. A discharge lamp lighting device for lighting a discharge lamp, the device comprising:
    a primary side circuit section connected to a power supply;
    a transformer, connected to the primary side circuit section, for transforming a voltage;
    a secondary side circuit section, connected to the transformer, for applying the transformed voltage to the discharge lamp;
    a detection circuit section, provided in the secondary side circuit section, for detecting an output voltage and an output current of the discharge lamp to detect a deviation from a predetermined power;
    a signal transmission element, provided between the primary side circuit section and the secondary side circuit section, for transmitting a signal corresponding to the deviation, which has been detected by the detection circuit section, to the primary side circuit section; and
    a switching control section, provided in the primary side circuit section, for carrying out switching control for constant power lighting based on the signal transmitted from the signal transmission element,
    wherein a secondary side winding of the transformer comprises a first winding and a second winding,
    the secondary side circuit section comprising:
        an auxiliary circuit for applying a voltage, transformed by the first winding and the second winding, to the discharge lamp until a predetermined condition is met after the startup of the discharge lamp; and
        a main circuit for applying a voltage, transformed by the first winding, to the discharge lamp after the predetermined condition has been met.

2. The discharge lamp lighting device according to claim 1, the auxiliary circuit comprising:

a diode connected to one end of the second winding;
a capacitor, connected to a cathode of the diode, for supplying a charged voltage to the discharge lamp; and
a switch connected to the cathode of the diode and the capacitor.

3. The discharge lamp lighting device according to claim 1, the main circuit comprising:
a diode connected to the other end of the second winding and one end of the first winding, the first winding and the second winding having a common output terminal; and
a capacitor, connected to a cathode of the diode, for supplying a charged voltage to the discharge lamp.

4. The discharge lamp lighting device according to claim 1, wherein the switch is turned ON at the startup of the discharge lamp to supply power from the auxiliary circuit to the discharge lamp, and the switch is turned OFF after the predetermined condition has been met.

5. The discharge lamp lighting device according to claim 1, wherein the predetermined condition requires a voltage of a capacitor of the main circuit to be equal to or lower than a predetermined voltage value,
wherein the auxiliary circuit is configured to apply the voltage, transformed by the first winding and the second winding, to the discharge lamp until the voltage of the capacitor of the main circuit becomes equal to or lower than the predetermined voltage value after the startup of the discharge lamp, and
wherein the main circuit is configured to apply the voltage, transformed by the first winding, to the discharge lamp after the voltage of the capacitor of the main circuit has become equal to or lower than the predetermined voltage value.

6. The discharge lamp lighting device according to claim 1, wherein the predetermined condition requires a current for the discharge lamp to be equal to or higher than a predetermined current value,
wherein the auxiliary circuit is configured to apply the voltage, transformed by the first winding and the second winding, to the discharge lamp until the current for the discharge lamp becomes equal to or higher than the predetermined current after the startup of the discharge lamp, and
wherein the main circuit is configured to apply the voltage, transformed by the first winding, to the discharge lamp after the current for the discharge lamp has become equal to or higher than the predetermined current.

7. The discharge lamp lighting device according to claim 1, further comprising:
a diode connected to an output of the main circuit; and
a diode connected to an output of the auxiliary circuit,
wherein a cathode of the diode, connected to the output of the main circuit, and a cathode of the diode, connected to the output of the auxiliary circuit, are connected to each other.

8. The discharge lamp lighting device according to claim 7, wherein the diode, connected to the output of the main circuit, and the diode, connected to the output of the auxiliary circuit, meet rated specifications for withstanding a high voltage to inhibit a high voltage generated by an igniter.

9. The discharge lamp lighting device according to claim 1, wherein the predetermined condition requires a lapse of a predetermined period of time,
wherein the auxiliary circuit is configured to apply the voltage, transformed by the first winding and the second winding, to the discharge lamp until the predetermined period of time has elapsed after the startup of the discharge lamp, and
wherein the main circuit is configured to apply the voltage, transformed by the first winding, to the discharge lamp after the predetermined period of time has elapsed.

10. The discharge lamp lighting device according to claim 9, further comprising:
a processor for executing the following steps of:
turning OFF the switch when an electrical quantity for the discharge lamp has exceeded a predetermined value within the predetermined period of time from the startup of the discharge lamp; and
turning ON the switch again when the electrical quantity for the discharge lamp has exceeded a value different from the predetermined value after the switch has been turned OFF by the above step.

* * * * *